(12) United States Patent
Calendrille, Jr.

(10) Patent No.: US 7,527,137 B1
(45) Date of Patent: May 5, 2009

(54) COMBINATION SHIFT AND BRAKE LEVER ARRANGEMENT FOR A BICYCLE

(76) Inventor: John L. Calendrille, Jr., 7 Canterbury Dr., Coram, NY (US) 11727

( * ) Notice: Subject to any disclaimer, the term of this patent is extended or adjusted under 35 U.S.C. 154(b) by 401 days.

(21) Appl. No.: 11/434,325

(22) Filed: May 15, 2006

Related U.S. Application Data

(60) Provisional application No. 60/681,977, filed on May 18, 2005.

(51) Int. Cl.
G05G 9/02 (2006.01)
B62M 25/04 (2006.01)
F16C 1/12 (2006.01)

(52) U.S. Cl. .............. 192/217; 74/473.14; 74/473.19; 74/473.33; 74/489; 74/502.2

(58) Field of Classification Search .......... 192/74, 192/217
See application file for complete search history.

(56) References Cited

U.S. PATENT DOCUMENTS

| | | | | |
|---|---|---|---|---|
| 3,972,247 | A * | 8/1976 | Armstrong | 74/489 |
| 4,100,820 | A | 7/1978 | Evett | |
| 4,132,296 | A | 1/1979 | Evett | |
| 4,319,673 | A | 3/1982 | Kojima | |
| 4,532,825 | A | 8/1985 | Nagano | |
| 4,800,768 | A * | 1/1989 | Kazuta | 74/63 |
| 5,178,033 | A * | 1/1993 | Kund | 74/501.5 R |
| 5,241,878 | A | 9/1993 | Nagano | |
| 5,257,683 | A | 11/1993 | Romano | |
| 5,400,675 | A | 3/1995 | Nagano | |
| 5,479,776 | A | 1/1996 | Romano | |
| 5,542,310 | A * | 8/1996 | Lee | 74/372 |
| 5,921,138 | A | 7/1999 | Kojima et al. | |
| 6,015,036 | A * | 1/2000 | Fukuda | 192/217 |
| 6,553,860 | B2 | 4/2003 | Blaschke | |
| 6,647,823 | B2 | 11/2003 | Tsumiyama et al. | |
| 6,691,591 | B2 | 2/2004 | Tsumiyama et al. | |
| 6,792,826 | B2 * | 9/2004 | Dal Pra' | 74/502.2 |
| 2001/0042421 | A1 * | 11/2001 | Feng et al. | 74/502.2 |
| 2002/0033064 | A1 * | 3/2002 | Ose | 74/502.2 |
| 2002/0104401 | A1 * | 8/2002 | Dal Pra | 74/502.2 |
| 2002/0139637 | A1 * | 10/2002 | Tsumiyama et al. | 192/217 |
| 2004/0237696 | A1 * | 12/2004 | Hilsky et al. | 74/501.6 |

* cited by examiner

Primary Examiner—Richard M. Lorence
(74) Attorney, Agent, or Firm—Richard M. Goldberg

(57) ABSTRACT

A combination shift and brake lever arrangement for a bicycle, includes a single lever for performing a braking operation and a shifting operation in both directions. A braking arrangement mounts the single lever for movement in a first front to back pivoting direction to perform a braking operation, while a shifting arrangement mounts the single lever for movement in a second side to side pivoting direction different from the first pivoting direction. A shift control mechanism controls shifting of gears of the bicycle in a first shifting direction upon movement of the single lever in the second pivoting direction, while a reverse control changes over the shift control mechanism to control shifting of the gears of the bicycle in a second opposite shifting direction upon movement of the single lever in the same second pivoting direction.

19 Claims, 40 Drawing Sheets

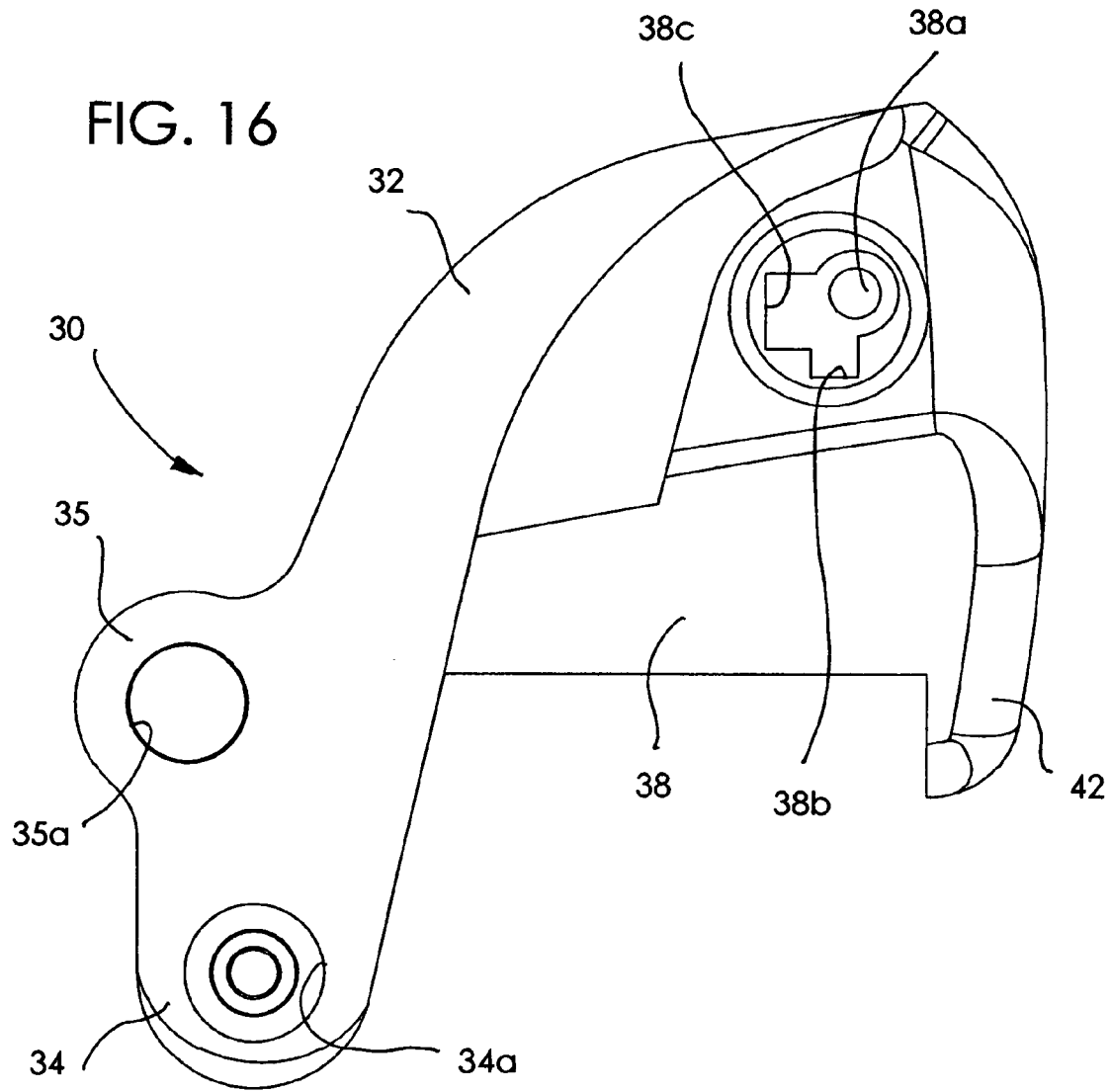

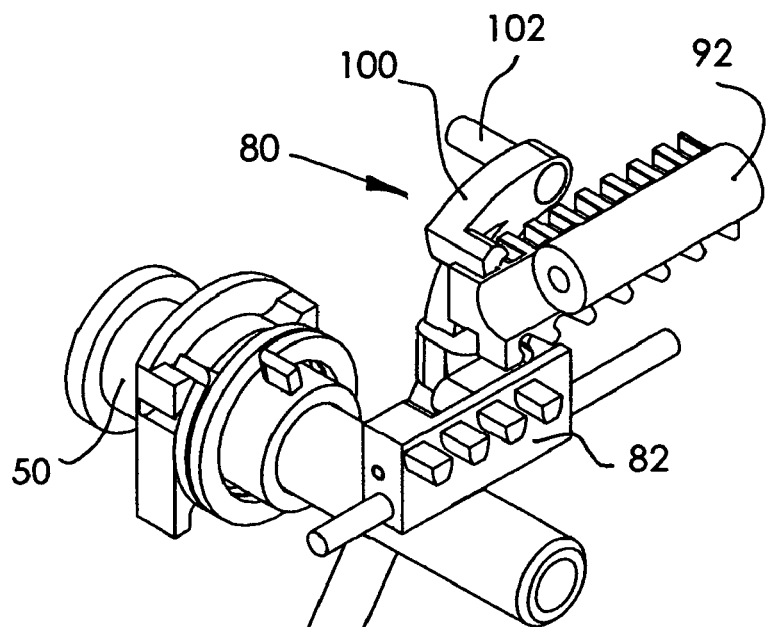
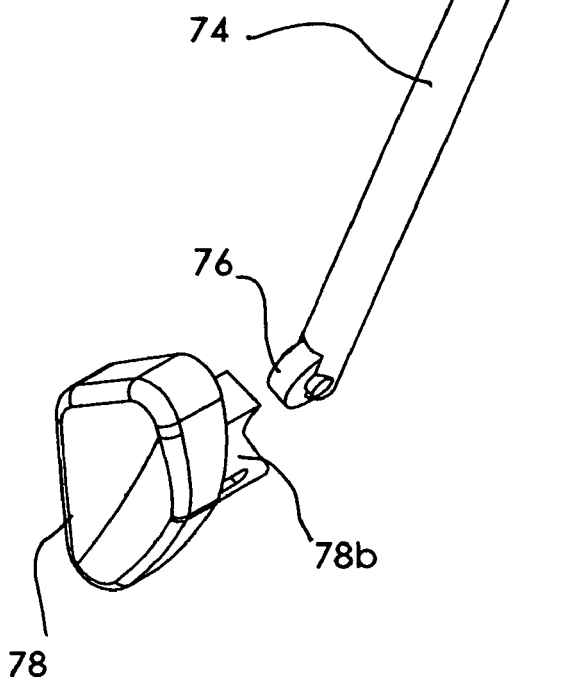
FIG. 38

COMBINATION SHIFT AND BRAKE LEVER ARRANGEMENT FOR A BICYCLE

REFERENCE TO RELATED APPLICATION

The present application claims priority from U.S. Provisional Application No. 60/681,977, filed May 18, 2005.

BACKGROUND OF THE INVENTION

The present invention relates generally to bicycle shifters and brake levers, and more particularly, is directed to a combination shift and brake lever arrangement for a bicycle using a single lever movable along two axes for braking and shifting.

Conventionally, shifters for bicycles have been mounted on the handlebar, separate and apart from the brake levers.

For example, Campagnolo S.r.l of Vicenza, Italy manufactures and sells a bicycle brake mechanism and a bicycle shift mechanism in which there are three levers, a brake lever, a separate shift lever that shifts sideways for changing gears in a first direction, and a third thumb lever for changing gears in a second opposite direction. This, however, in manufacture and use, becomes complicated and burdensome to use.

Serenissima World Cycle Diffusion srl of San Vendemiano, Italy manufactures and sells a bicycle brake mechanism and a bicycle shift mechanism under the trademark "MODOLO" in which there is a brake lever and two separate thumb levers for performing a shifting operation in opposite directions. This, again, in manufacture and use, becomes complicated and burdensome to use.

SRAM Corporation of Chicago, Ill. manufactures and sells a bicycle brake mechanism and a bicycle shift mechanism in which there is a first lever for braking and a second shift lever. Depending upon how far the lever is pushed will depend on the direction of shifting.

However, recently, shift levers have been combined with brake levers. For example, Shimano Inc. of Osaka, Japan manufactures and sells a bicycle brake mechanism and a bicycle shift mechanism in which a common lever is used for both braking and shifting gears in a first direction. However, there is a second lever for shifting gears in the second opposite direction. This, again, in manufacture and use, becomes complicated and burdensome to use.

U.S. Pat. No. 6,647,823 to Tsumiyama et al and owned by Shimano Inc. discloses a single lever used for braking and for shifting and both directions. The brake lever is pivoted in a first forward to back direction for braking, a second clockwise side to side movement for shifting in a first direction and a third counterclockwise side to side movement for shifting in a second opposite direction. However, the rider must remember which direction to pivot the lever in the side to side direction for shifting.

OBJECTS AND SUMMARY OF THE INVENTION

Accordingly, it is an object of the present invention to provide a combination shift and brake lever arrangement for a bicycle that overcomes the problems with the aforementioned prior art.

It is another object of the present invention to provide a combination shift and brake lever arrangement for a bicycle that uses a single lever for braking and for shifting in both directions.

It is still another object of the present invention to provide a combination shift and brake lever arrangement for a bicycle in which the pivoting motion for braking is front to back, while the same clockwise pivoting motion is provided for shifting gears in both directions so that a rider does not need to remember which direction to move the lever in a side to side direction.

It is yet another object of the present invention to provide a combination shift and brake lever arrangement for a bicycle in which the internal shift control mechanism is changed over by a push button or the like for changing the switching direction upon side to side movement of the lever.

It is a further object of the present invention to provide a combination shift and brake lever arrangement for a bicycle that is compact, economical and easy to use.

In accordance with an aspect of the present invention, a combination shift and brake lever arrangement for a bicycle, includes a single lever. A braking arrangement mounts the single lever for movement in a first pivoting direction to perform a braking operation, while a shifting arrangement mounts the single lever for movement in a second pivoting direction different from the first pivoting direction. A shift control mechanism controls shifting of gears of the bicycle in a first shifting direction upon movement of the single lever in the second pivoting direction, while a reverse control changes over the shift control mechanism to control shifting of the gears of the bicycle in a second opposite shifting direction upon movement of the single lever in the same second pivoting direction. The first pivoting direction is a front to back direction, and the second pivoting direction is a side to side direction.

The braking arrangement includes a first housing for mounting the combination shift and brake lever arrangement to a handlebar of a bicycle, a second housing holding the single lever, and a first pivot arrangement for pivotally mounting the second housing to the first housing for pivotal movement in the first pivoting direction.

The shifting arrangement includes a housing and a pivot arrangement for pivotally mounting the single lever to the housing for pivotal movement in the second pivoting direction.

The shift control mechanism is housed inside of the second housing. The shift control mechanism includes a first actuator coupled with the single lever for moving in response to pivotal movement of the single lever in the second pivoting direction, a second actuator coupled with a shift cable of a bicycle for changing a gear of a derailleur of a bicycle, and an engagement arrangement associated with the first and second actuators for shifting the second actuator in response to movement of the first actuator.

The single lever includes a first set of teeth, and the first actuator includes an actuating rack having a second set of teeth for meshing with the first set of teeth such that pivotal movement of the single lever results in translation movement of the actuating rack. The second actuator includes a cable carrier rack having a third set of teeth, and the engagement arrangement includes a first pawl mounted to the actuator rack for engaging with the third set of teeth to move the cable carrier rack with the actuator rack upon pivotal movement of the single lever. The third set of teeth are inclined in a first direction of movement of the cable carrier rack.

In a first embodiment, the cable carrier rack includes a fourth set of teeth, and the engagement arrangement includes a second pawl mounted to the housing for engaging with the fourth set of teeth to releasably lock the cable carrier rack in a desired position after the cable carrier rack has been moved with the actuator rack upon pivotal movement of the single lever.

In a first embodiment, the reverse control includes a device for disengaging the second pawl from the fourth set of teeth and for engaging the cable carrier rack after the cable carrier rack has been moved with the actuator rack upon pivotal movement of the single lever. Specifically, the device for disengaging includes a plunger movable in the single lever between a first position out of engagement with the second pawl and a second position into engagement with the second pawl to disengage the second pawl from the fourth set of teeth, and an actuator for actuating the plunger to move between the first and second positions. The cable carrier rack includes a fifth set of teeth, and the plunger also engages the fifth set of teeth of the cable carrier rack in the second position to releasably lock the cable carrier rack in a desired position after the cable carrier rack has been moved with the actuator rack upon pivotal movement of the single lever. Preferably, the actuator includes a push button slidable in the single lever, the push button having a cam surface for moving the plunger to the second position when the push button is depressed into the single lever.

In a second embodiment, the shift control mechanism includes a grate having a plurality of openings therein fixed to the housing, and the engagement arrangement includes a second pawl mounted to the cable carrier rack for engagement with the openings in the grate to releasably lock the cable carrier rack in a desired position after the cable carrier rack has been moved with the actuator rack upon pivotal movement of the single lever.

In the second embodiment, the reverse control includes a device for disengaging the second pawl from the openings in the grate and for engaging the openings in the grate after the cable carrier rack has been moved with the actuator rack upon pivotal movement of the single lever. The device for disengaging includes a grate release movable between a first position out of engagement with the grate and a second position in engagement with the grate so as to move the second pawl from the openings in the grate after the cable carrier rack has been moved with the actuator rack upon pivotal movement of the single lever and for engaging the second pawl and for engaging said second pawl after said second pawl has been removed from said openings thereat, a plunger movable in the single lever between a first position out of operative engagement with the grate release and a second position into operative engagement with the grate release to move the grate release into engagement with the grate to disengage the second pawl from the grate, and an actuator for actuating the plunger to move between the first and second positions thereof. Preferably, the actuator includes a push button slidable in the single lever, the push button having a cam surface for moving the plunger to the second position when the push button is depressed into the single lever.

The above and other objects, features and advantages of the invention will become readily apparent from the following detailed description thereof which is to be read in connection with the accompanying drawings.

BRIEF DESCRIPTION OF THE DRAWINGS

FIG. 16 is a left side elevational view of the carrier housing;

FIG. 38 is a perspective view similar to FIG. 34, but with the combination shift/brake lever removed;

DETAILED DESCRIPTION

Figure 1A:
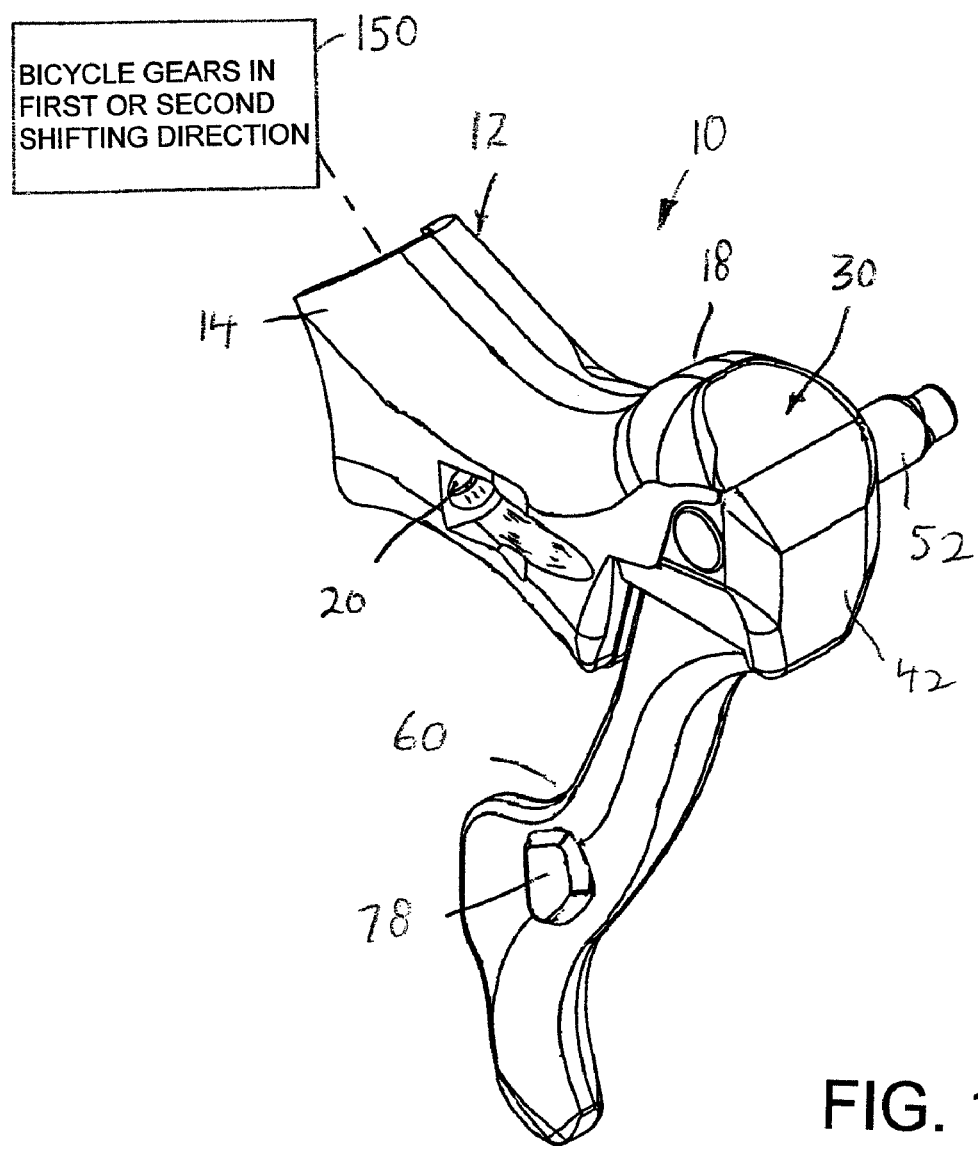
FIG. 1A is a perspective view of a combination shift and brake lever arrangement for a bicycle according to a first embodiment of the present invention.
Figures 1B, 1C:
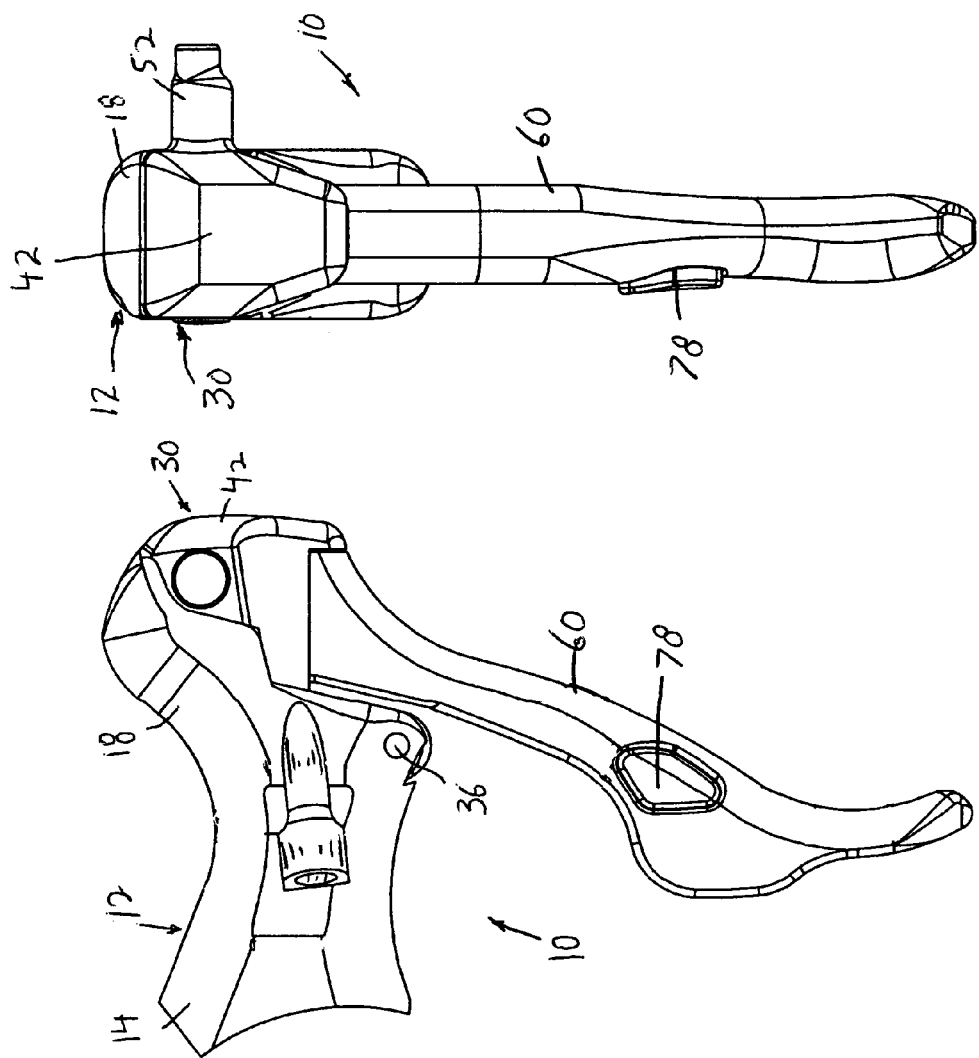
FIG. 1B is a left side elevational view of the combination shift and brake lever arrangement of FIG. 1A.
FIG. 1C is a front elevational view of the combination shift and brake lever arrangement of FIG. 1A.
Figure 2:
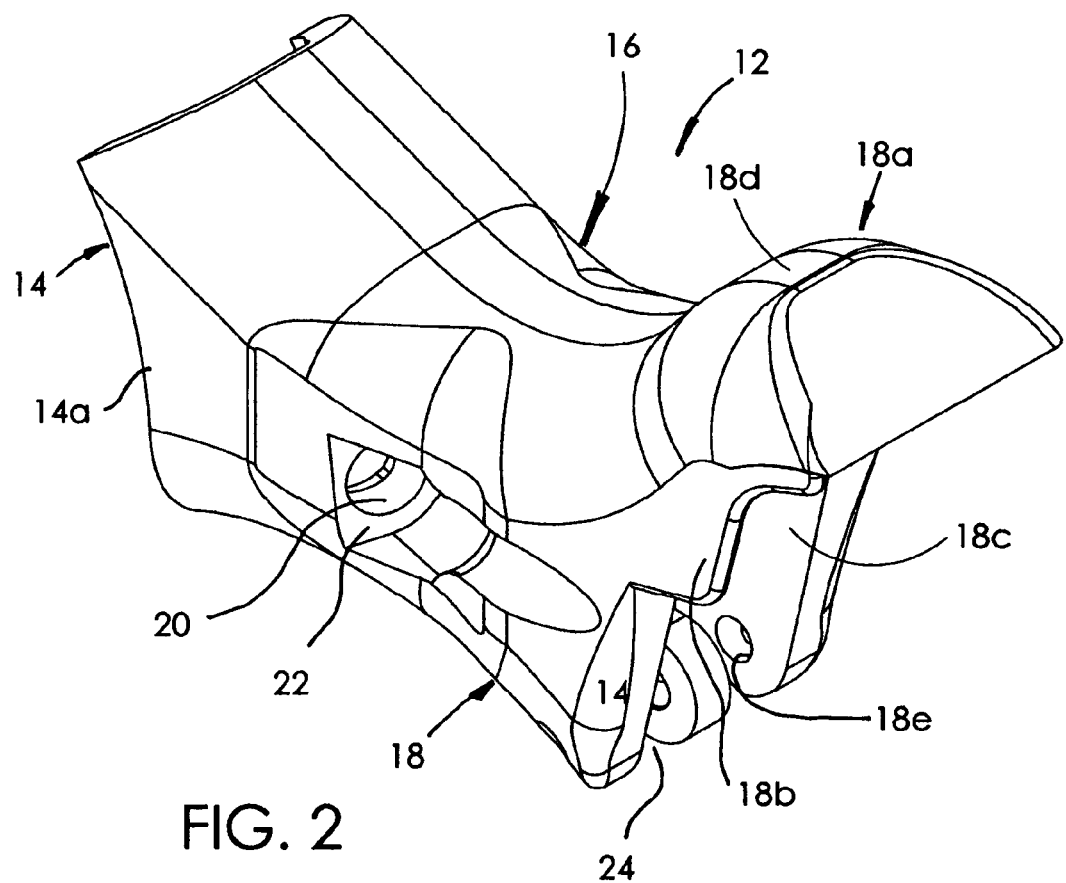
FIG. 2 is a perspective view of the main housing from the top, left side.
Figure 3:
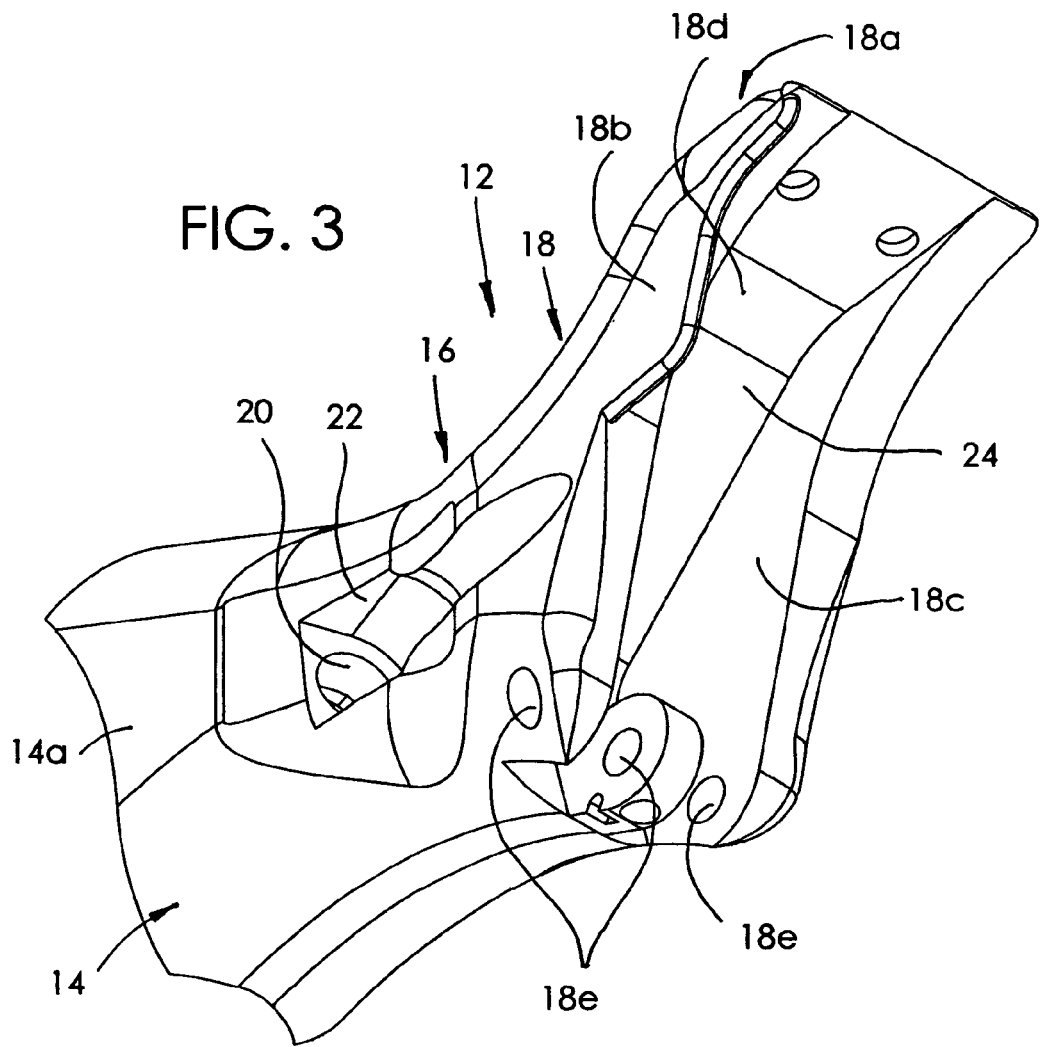
FIG. 3 is a perspective view of the main housing from the bottom, left side.
Figure 4:
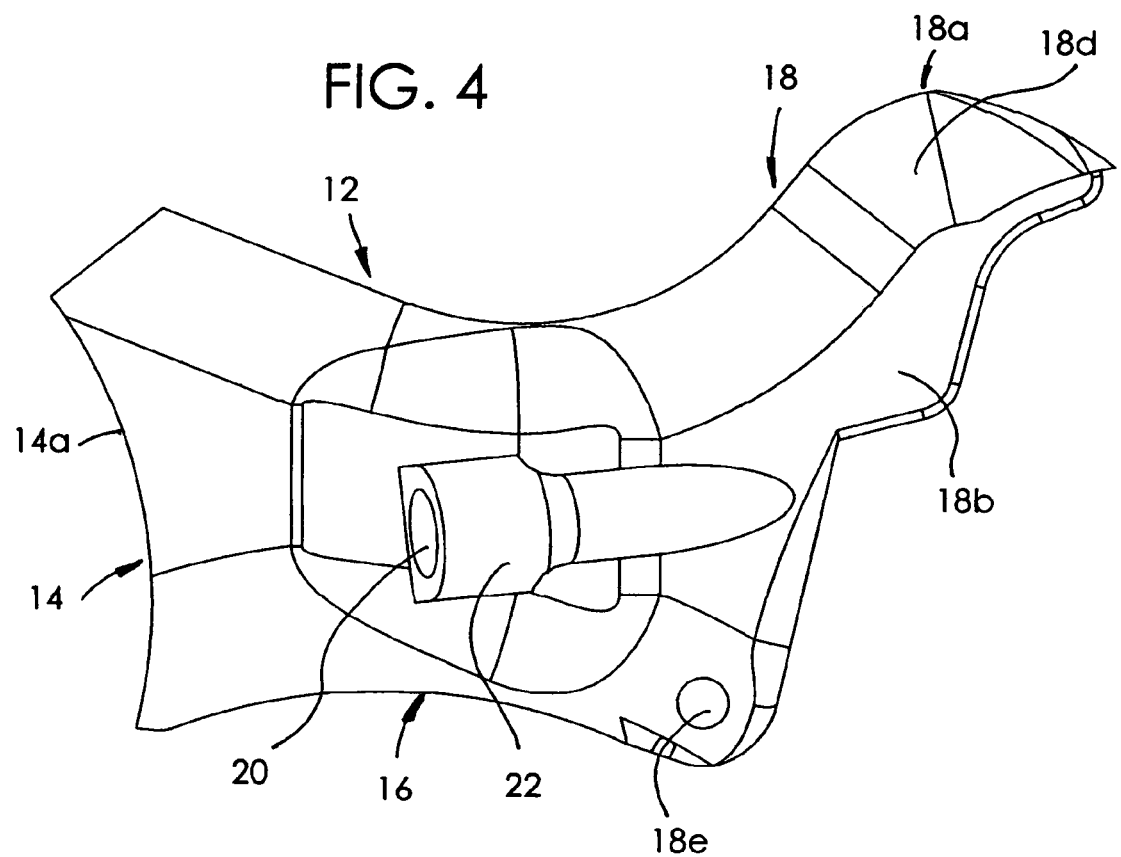
FIG. 4 is a left side elevational view of the main housing.
Figure 5:
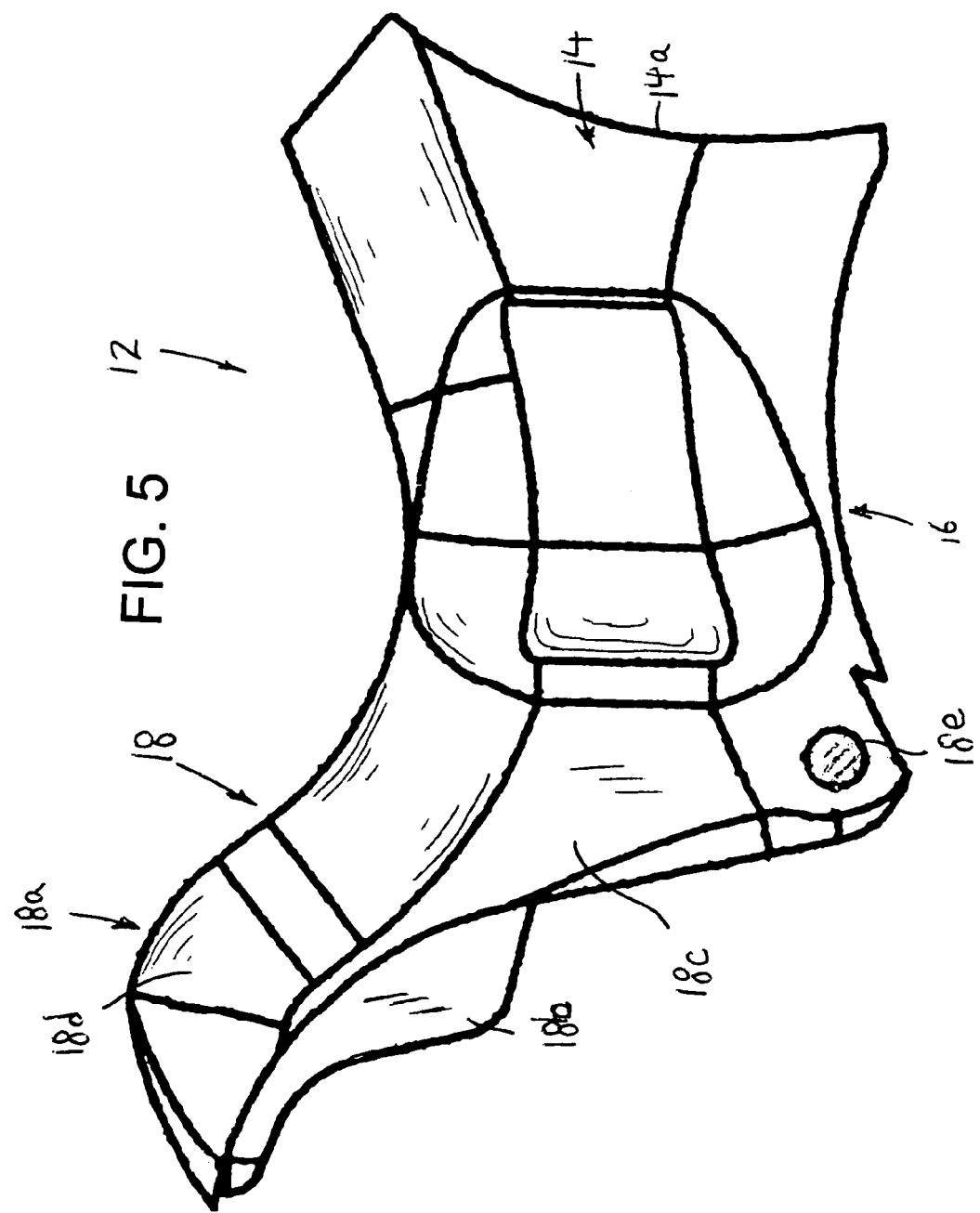
FIG. 5 is a right side elevational view of the main housing.
Figure 6:
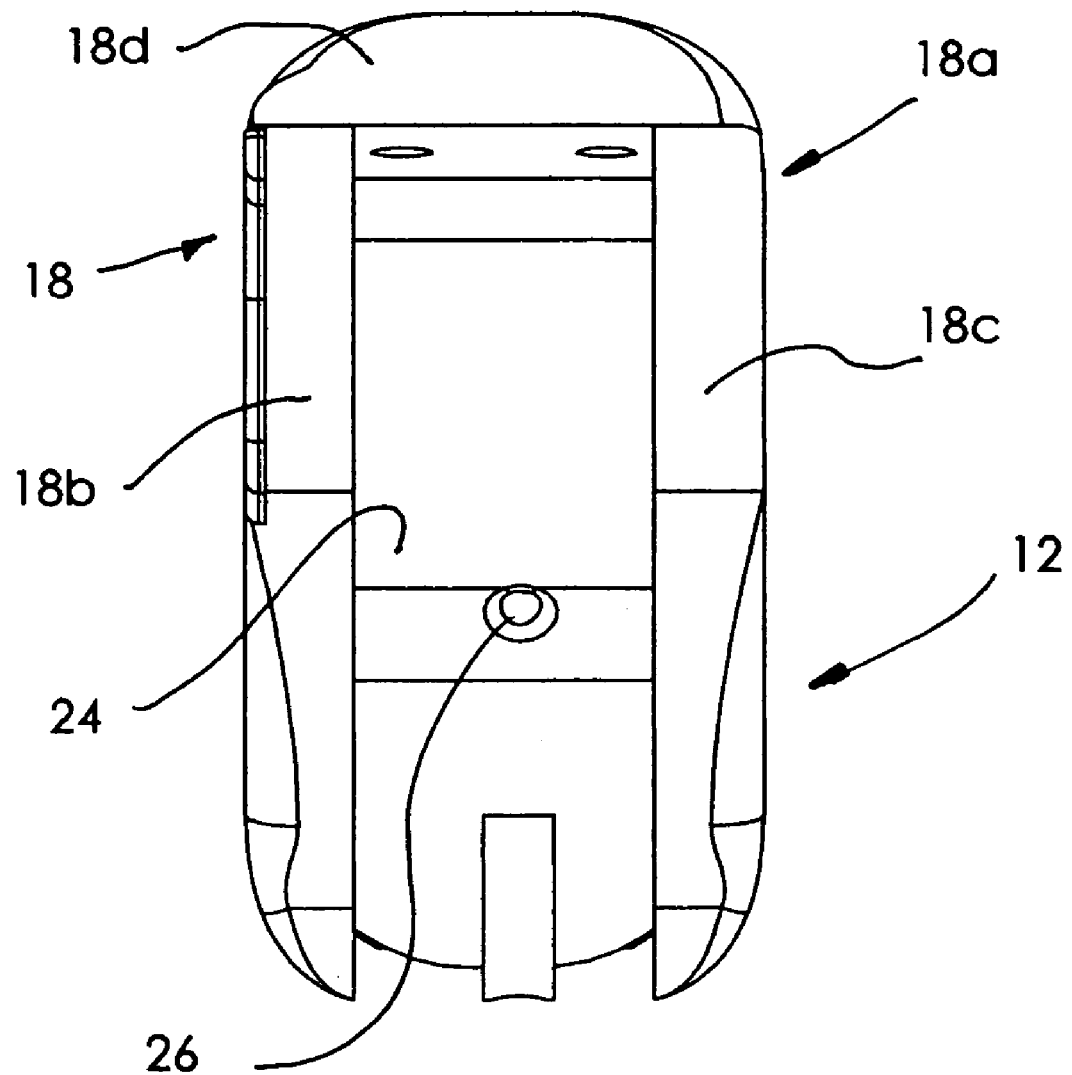
FIG. 6 is a front elevational view of the main housing.

Referring to the drawings in detail, and initially to FIGS. 1A-1C, a combination shift and brake lever arrangement 10 for a bicycle according to the present invention, to be mounted on the handlebar of a bicycle, includes a main housing 12 to be secured to a handlebar of a bicycle.

Figure 7:
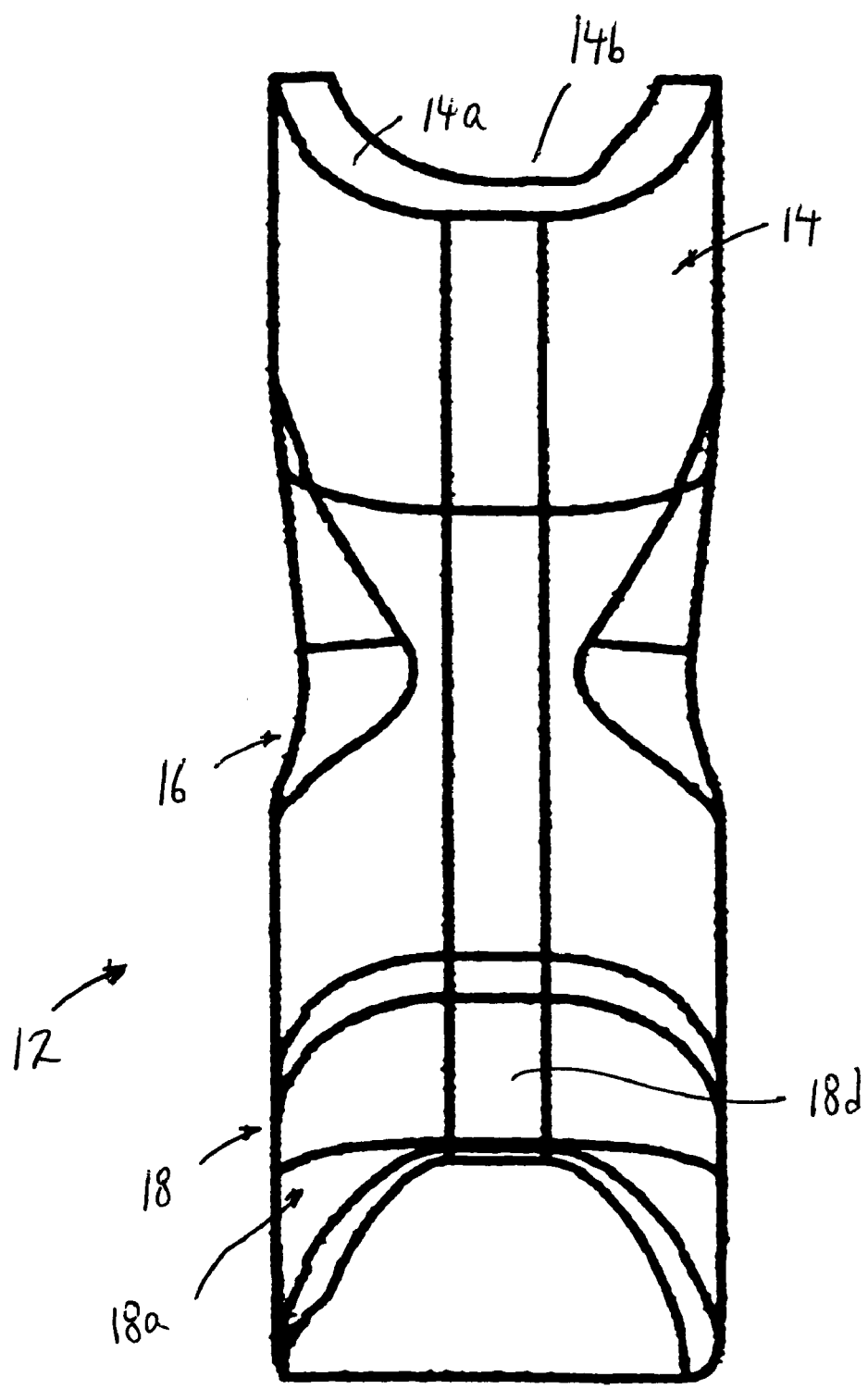
FIG. 7 is a top plan view of the main housing.
Figure 8:
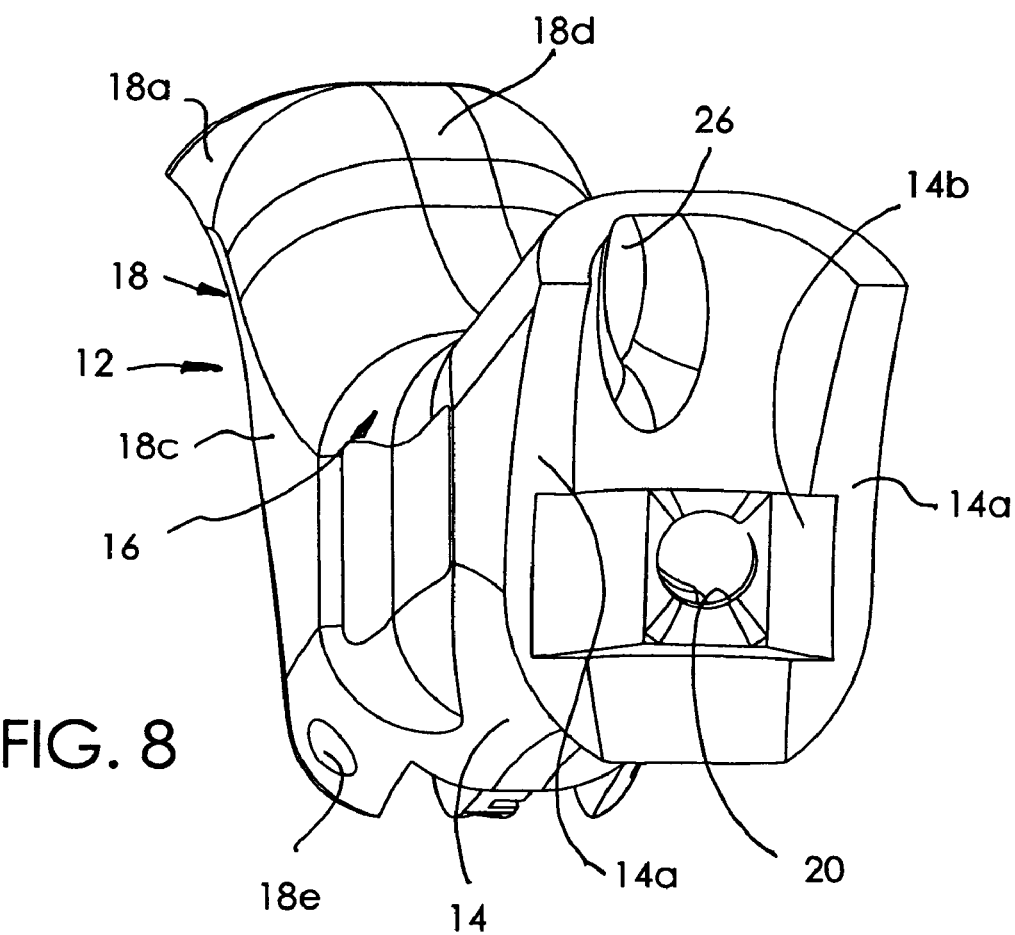
FIG. 8 is a perspective view of the main housing from the rear, right side.
Figure 9:
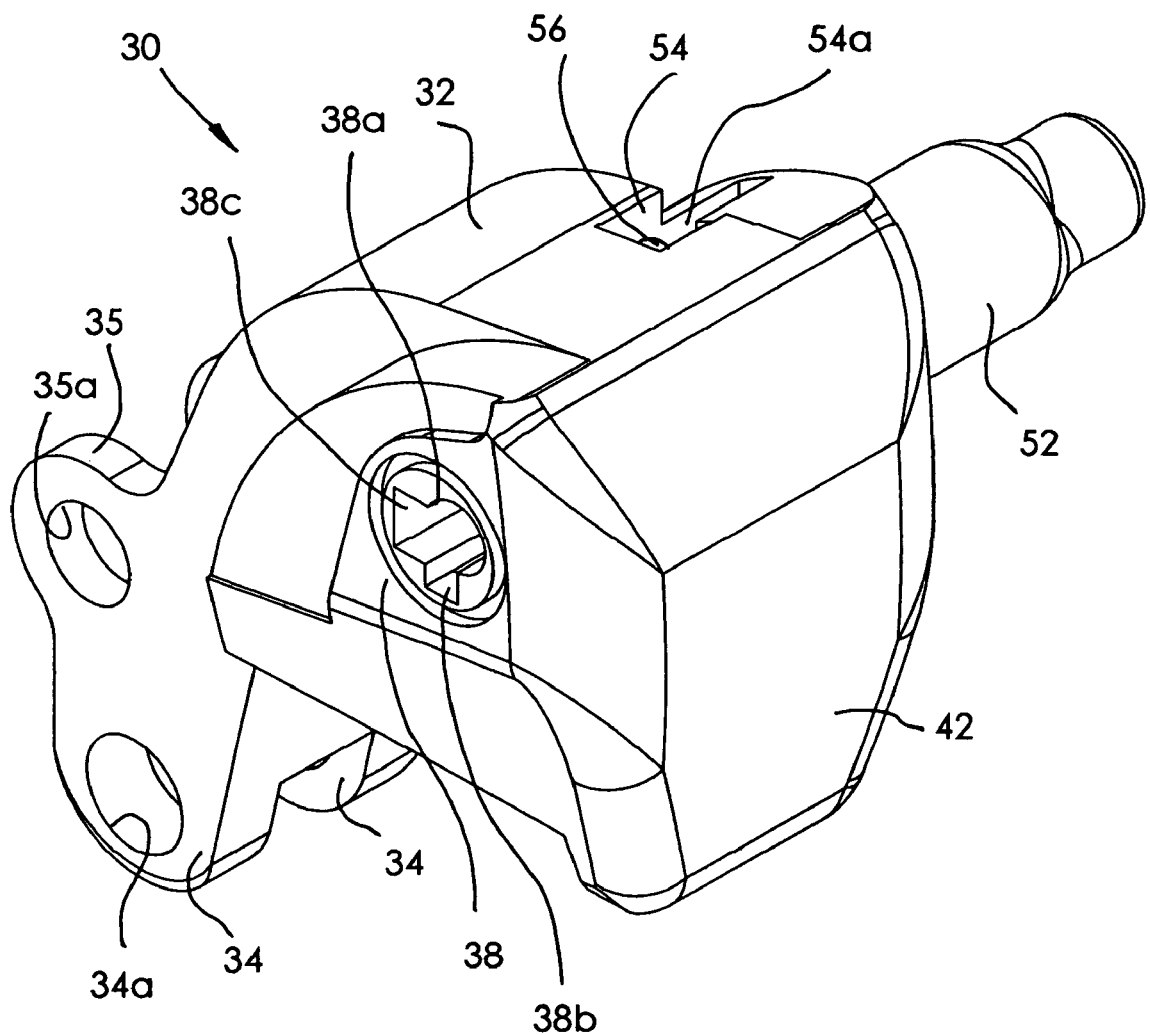
FIG. 9 is a perspective view of the carrier housing from the top front, left side.
Figure 10:
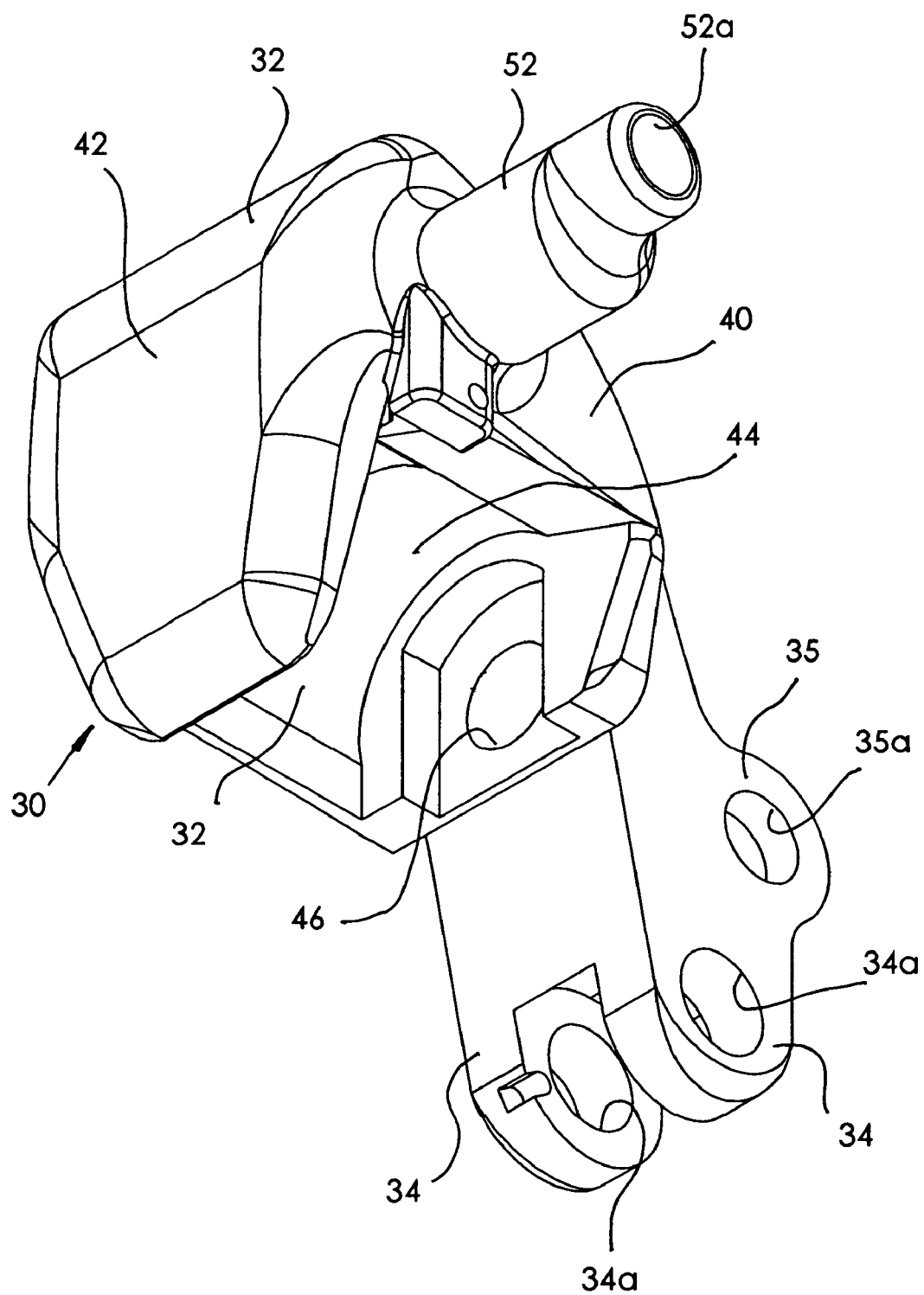
FIG. 10 is a perspective view of the carrier housing from the bottom front, right side.
Figure 11:
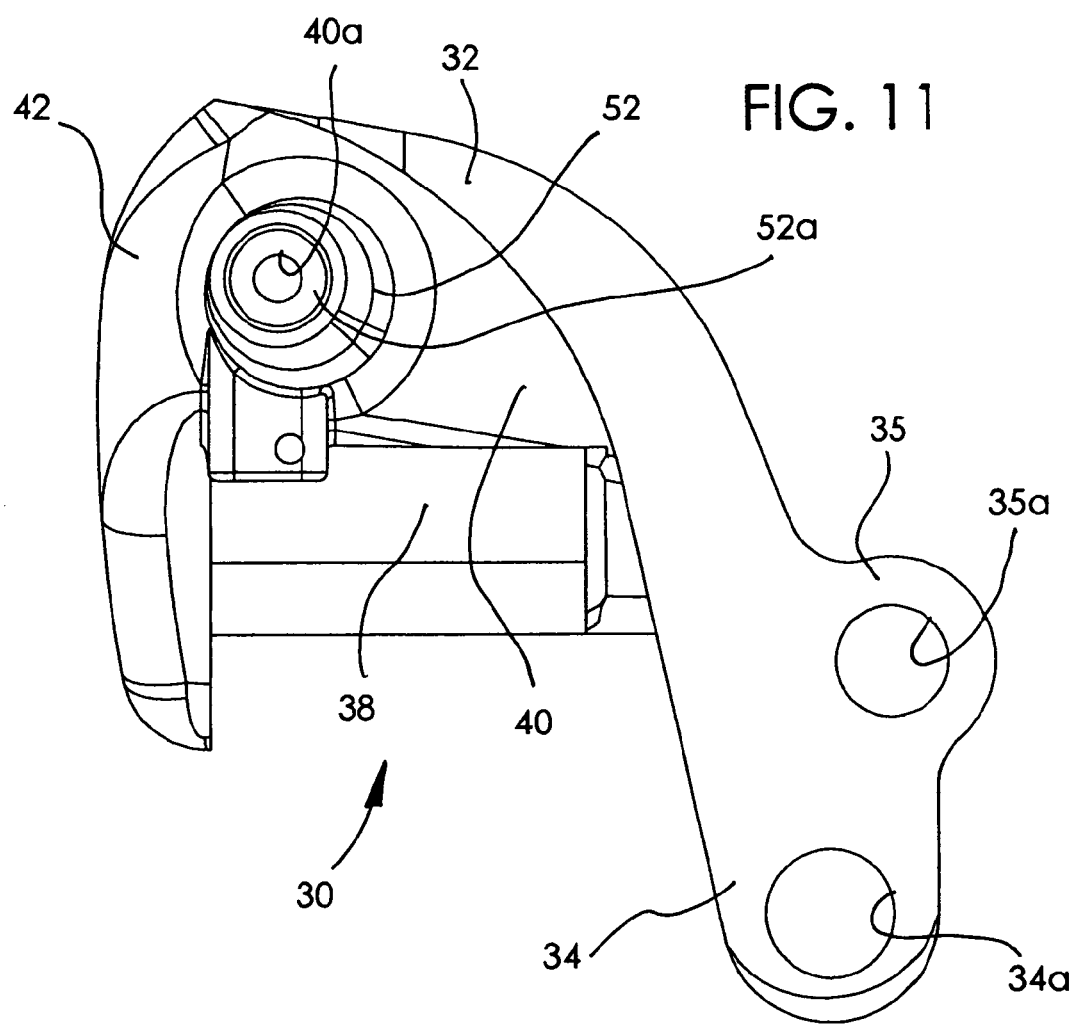
FIG. 11 is a right side elevational view of the carrier housing.
Figure 12:
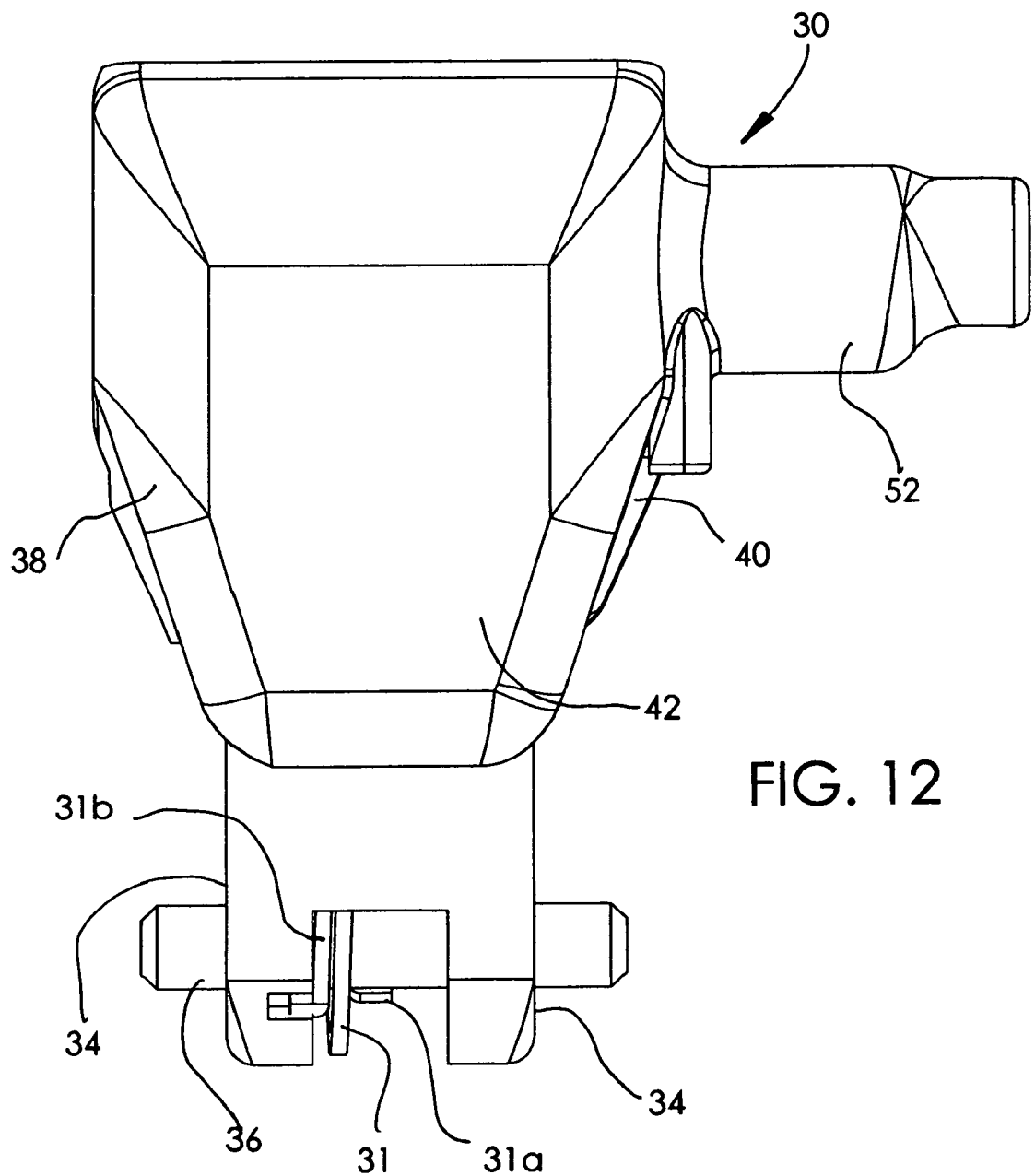
FIG. 12 is a front elevational view of the carrier housing.

Specifically, as shown best in FIGS. 2-8, main housing 12 has a somewhat hyperboloid configuration (FIGS. 4 and 5) with a generally rectangular configuration when viewed from the top in FIG. 7. In this regard, main housing 12 includes a rear section 14 having a generally rectangular transverse cross-section which tapers in dimensions down to a central section 16 having a generally rectangular transverse cross-section, and then expands out in dimension to a front section 18 also having a generally rectangular transverse cross-section. Rear section 14 has an arcuate end face 14a that seats flush on a curved section of the handlebar of a bicycle, as is well known. Rear section 14 has an open cut-out area 14b at the lower portion of end face 14a. A through bore 20 extends through main housing 12 and connects cut-out area 14b with a recess 22 in the left side outer face of central section 16. In this manner, a clamp (not shown) which is wrapped around the handlebar extends within cut-out area 14, with the clamp having an outwardly extending bolt (not shown) that extends into through bore 20 and is threadedly secured in a hollow internally threaded bolt (not shown) that acts as a nut and that extends through the opposite end of through bore 20 at recess 22 in order to secure main housing 12 to the handlebar. Such securing arrangement is well known, for example, in the shift brake/lever arrangement of the Model ST-R600 sold by Shimano, Inc. of Japan.

Front section 18 includes an upwardly extending peak section 18a. A central recess 24 is formed in front section 18 and is defined by two parallel, spaced apart side walls 18b and 18c, and a combined arcuate back/top wall 18d. A through bore 26 extends from arcuate back/top wall 18d, through central section 16 and out at rear section 14. A brake cable (not shown) extends through bore 26 and is connected to either the rear or front brake assembly, in a known manner. Further, the lower end of each side wall 18b and 18c includes an opening 18e, the purpose for which will be explained hereafter.

A carrier housing 30 is secured to front section 18 of main housing 12. As shown best in FIGS. 9-16, carrier housing 30 includes a combined arcuate back/top wall 32 that corresponds generally in dimensions and shape to combined arcuate back/top wall 18d. The lower end of combined arcuate back/top wall 32 terminates in two parallel spaced apart lower walls 34 that fit within side walls 18b and 18c and which are each provided with an aligned opening 34a. Openings 34a are in alignment with openings 18e, and a pivot pin 36 (FIG. 1B) is mounted therethrough to pivotally connect carrier housing 30 to main housing 12.

Two parallel, spaced apart circular tab walls 35 extend out from arcuate back/top wall 32 at a position immediately above lower walls 34 and are in parallel planar relation to lower walls 34. Each tab wall 35 includes an opening 35a, with openings 35a of both tab walls 35 being in alignment with each other. A yoke (not shown) is connected between openings 35a in a known manner, and a brake cable (not shown) is tied at one end to the yoke, extends through bore 26 and is connected to either the rear or front brake assembly, in a known manner.

Carrier housing 30 further includes two substantially planar side walls 38 and 40 of a substantially quarter circular shape and which are connected to the side edges of combined arcuate back/top wall 32 and extend to the front edge of combined arcuate back/top wall 32, and a front wall 42 that connects the front edge of combined arcuate back/top wall 32 and front edges of side walls 38 and 40. As a result, a large open area 44 is defined between combined arcuate back/top wall 32, left and right side walls 38 and 40, and front wall 42 for housing the shift control mechanism to be described hereafter.

A through bore 46 is formed in combined arcuate back/top wall 32 at a position above spaced apart lower walls 34. A circular recess 48 is formed in front wall 42 in alignment with through bore 46, and a pivot pin 50 is connected therebetween for pivotally supporting the shift/brake lever in left and right directions for a shifting operation, as will be understood from the explanation hereafter.

Figure 33:
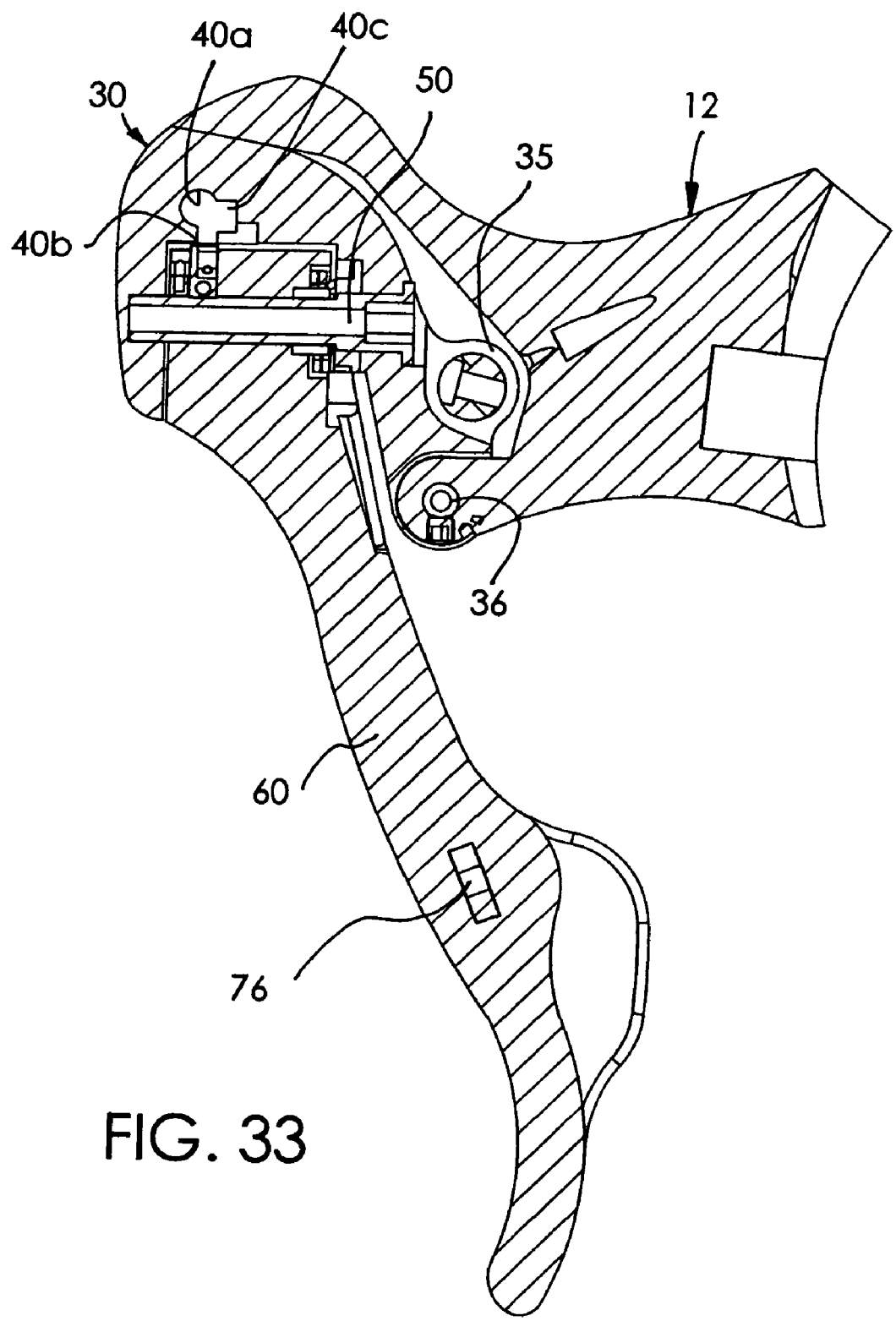
FIG. 33 is a schematic longitudinal cross-sectional view of the combination shift and brake lever arrangement of FIG. 1A.

Left side wall 38 includes a circular opening 38a, a lower rectangular guide 38b in open communication with circular opening 38a at around the seven o'clock position thereof, and a rear rectangular guide 38c in open communication with circular opening 38a at around the nine o'clock position thereof. Right side wall 40 in like manner includes a circular opening 40a in alignment with opening 38a, a lower rectangular guide 40b (FIG. 33) in open communication with circular opening 40a at around the five o'clock position thereof and in alignment with lower rectangular guide 38b, and a rear rectangular guide 40c (FIG. 33) in open communication with circular opening 40a at around the three o'clock position thereof and in alignment with rear rectangular guide 38c.

A tubular guide 52 extends outwardly from right side wall 40 and has an opening 52a in alignment with opening 40a in right side wall 40. An L-shaped cut-out area 54 is provided in the top of combined arcuate back/top wall 32 adjacent to tubular guide 52, and a small through bore 56 (FIG. 14) is provided in one of the walls 54a (FIGS. 9 and 14) defining L-shaped cut-out area 54.

Figure 13:
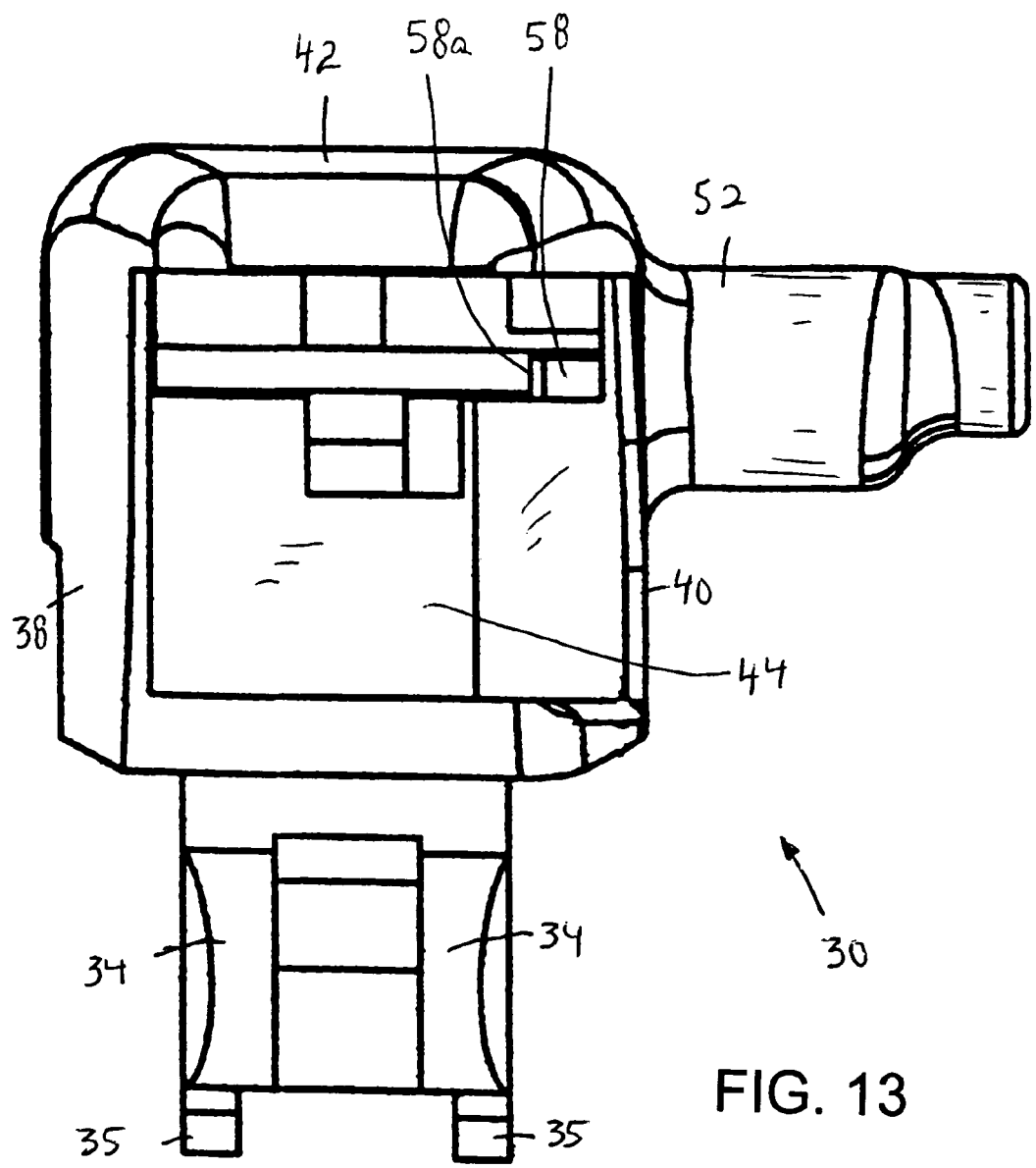
FIG. 13 is a bottom plan view of the carrier housing.
Figure 14:
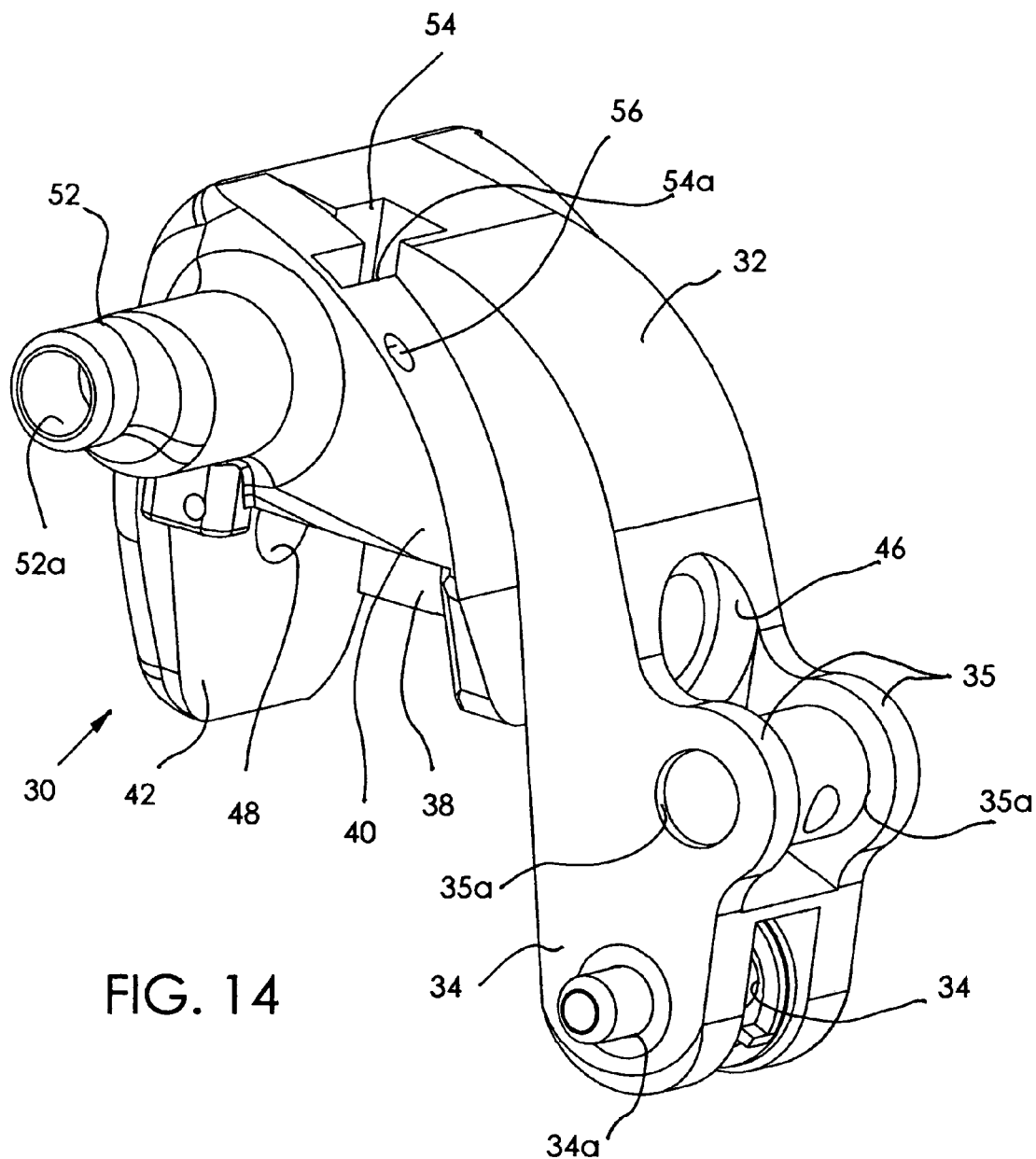
FIG. 14 is a perspective view of the carrier housing from the rear, right side.
Figure 15:
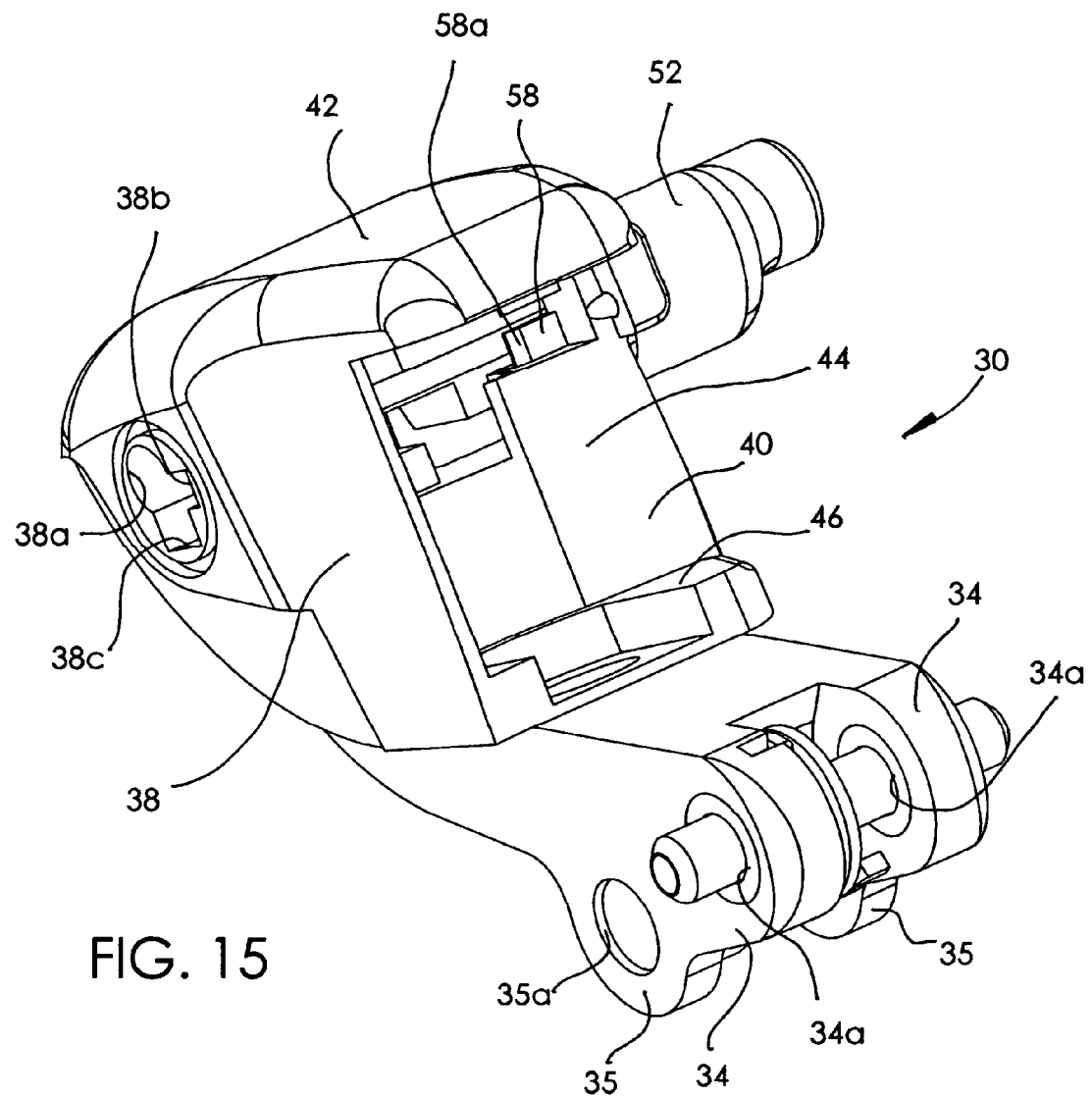
FIG. 15 is a bottom perspective view of the carrier housing.
Figure 21:
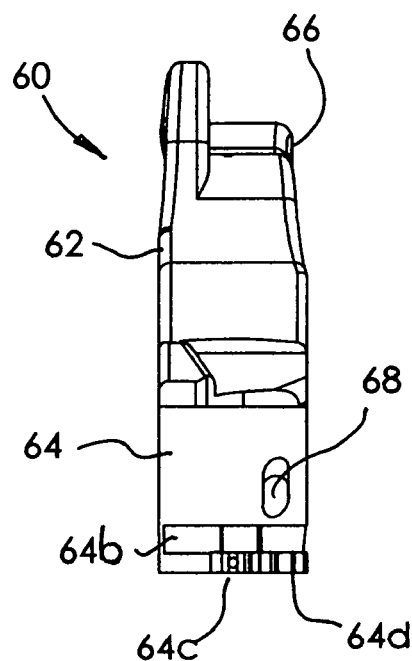
FIG. 21 is a top plan view of the combination shift/brake lever.
Figure 17:
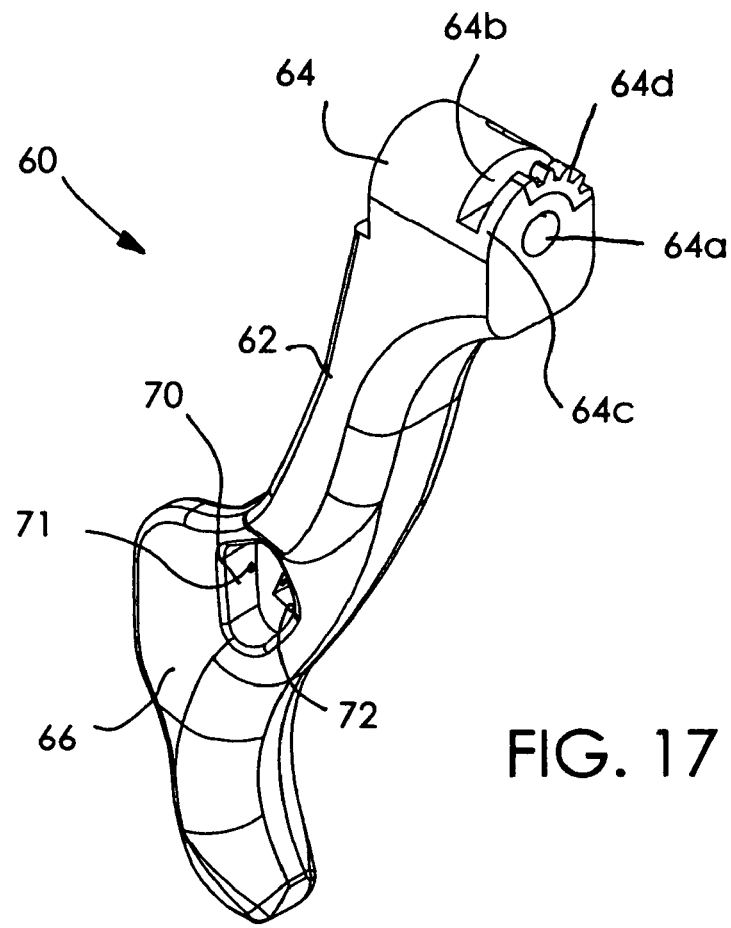
FIG. 17 is a perspective view of the combination shift/brake lever.
Figure 18:
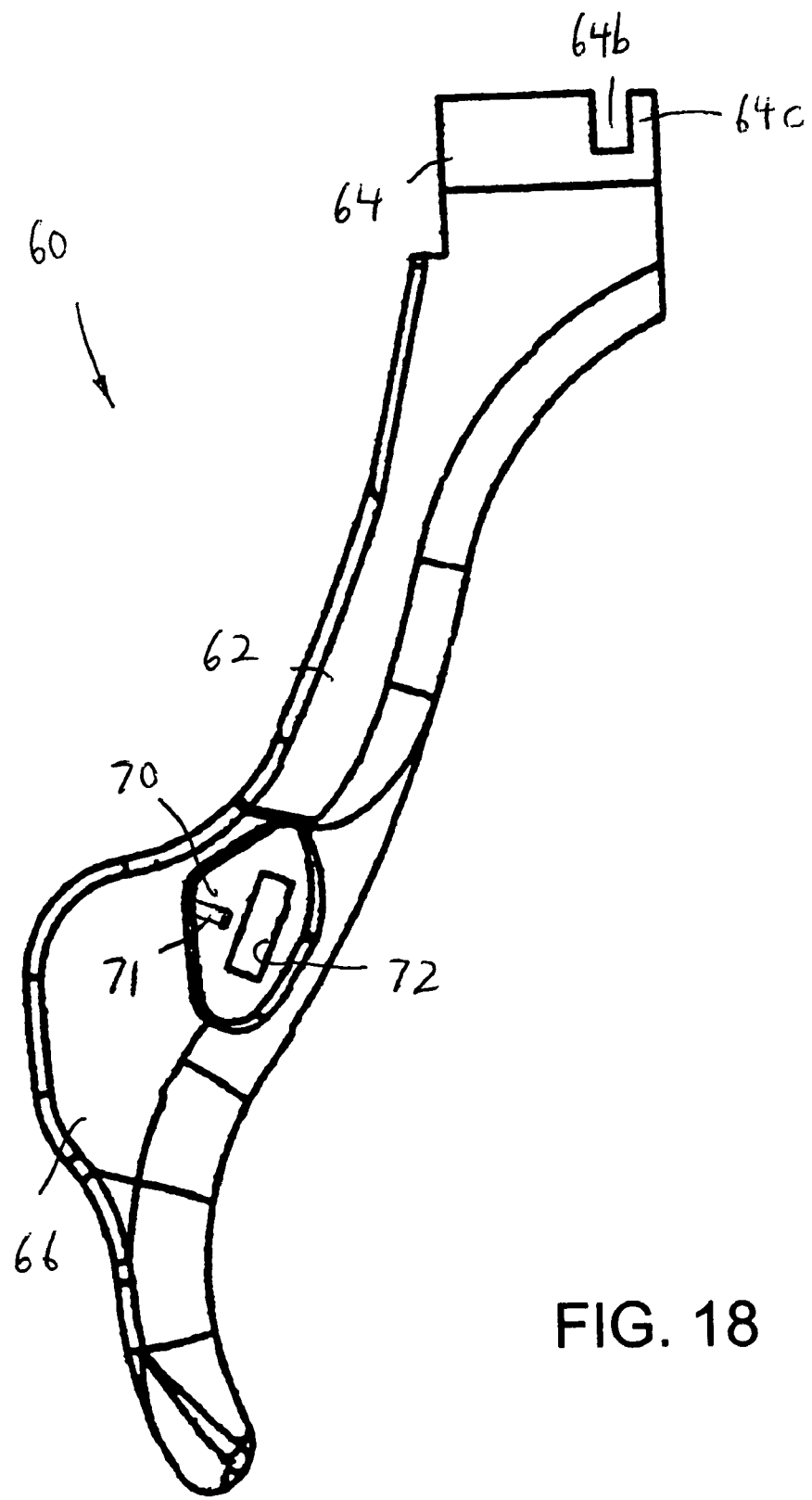
FIG. 18 is a left side elevational view of the combination shift/brake lever.
Figure 19:
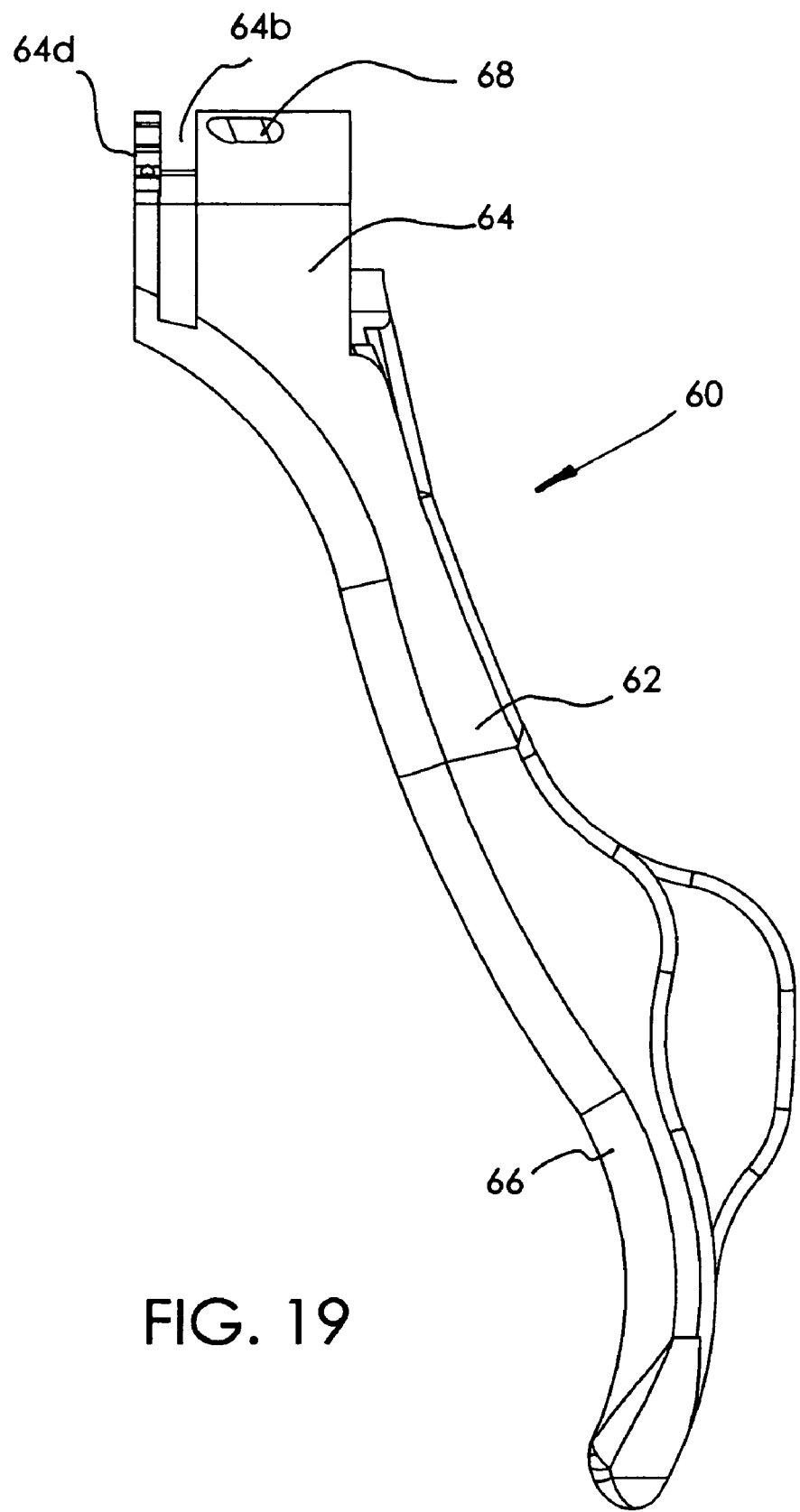
FIG. 19 is a right side elevational view of the combination shift/brake lever.
Figure 20:
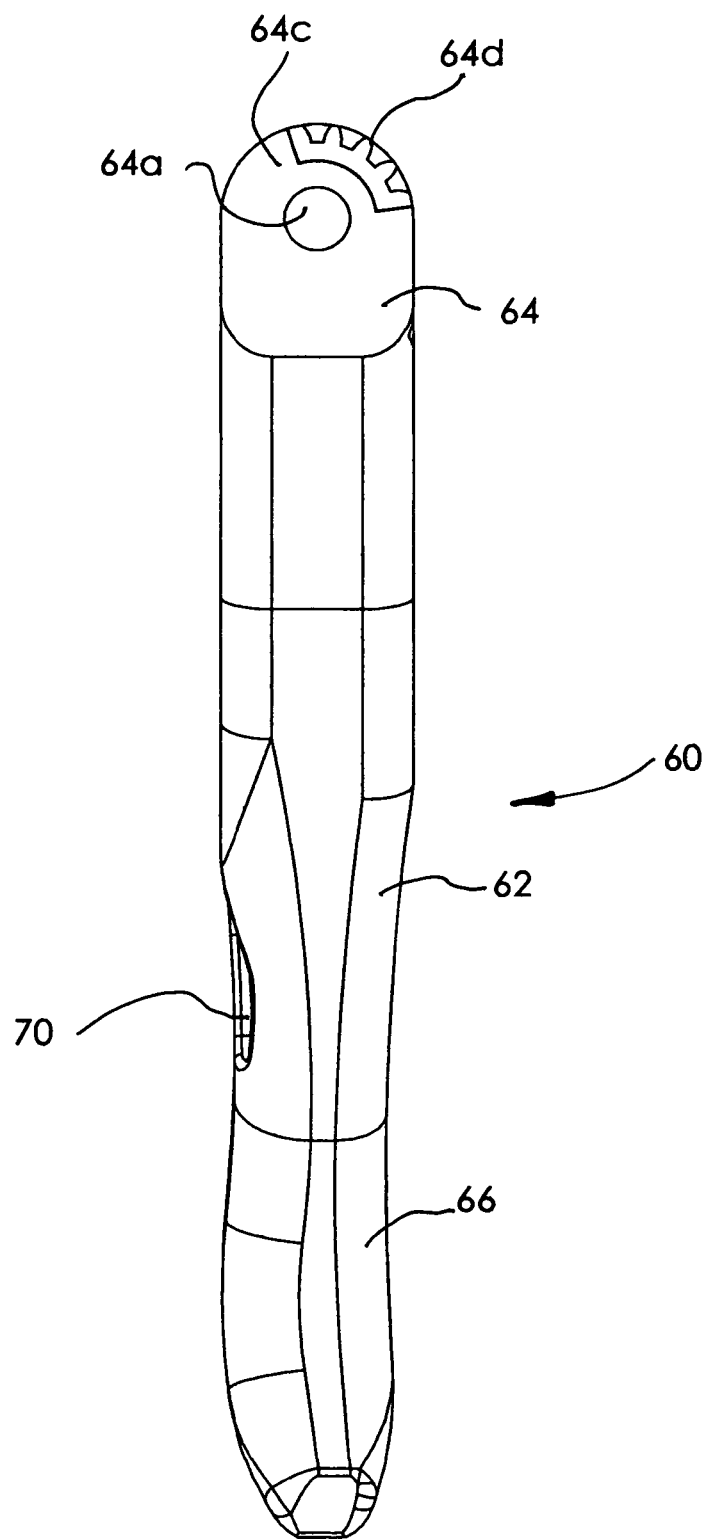
FIG. 20 is a front elevational view of the combination shift/brake lever.

As shown in FIGS. 13 and 15, carrier housing 30 also includes a hold down tab 58 extending from the inner surface of right side wall 40 adjacent the lower rectangular guide 40b therein, with hold down tab 58 having an inclined or beveled surface 58a at the free end thereof, the purpose for which will become apparent from the discussion hereafter.

A combination shift/brake lever 60 is mounted to carrier housing 30. Specifically, as shown best in FIGS. 17-21, shift/brake lever 60 includes an elongated body 62 having a substantially cylindrical shaped enlarged head 64 at the upper end thereof and a substantially foot shaped lower end 66. Enlarged head 64 has a front to back through bore 64a through which pivot pin 50 extends for pivotally supporting shift/brake lever 60 in left and right, that is, side to side, directions of carrier housing 30 for a shifting operation. With this arrangement, when shift/brake lever 60 is grasped and pulled toward the person, carrier housing 30 is caused to pivot relative to main housing 12 around pivot pin 36. This results in a pulling of the brake cable connected to carrier housing 30, and a resultant braking operation. A torsion spring 31 (FIG. 12) has one end 31a connected to main housing 12 and an opposite end 31b connected to carrier housing 30 in a conventional manner to normally bring shift/brake lever 60 and carrier housing 30 back to a neutral position after a pivoting force applied by the user thereto to perform a braking operation is removed.

Enlarged head 64 has an arcuate transverse groove 64b at the upper surface thereof, at a position above through bore 64a so as not to interfere with the side to side pivoting action of shift/brake lever 60 around pivot pin 50. As a result, an front arcuate wall 64c is formed as one boundary of transverse groove 64b. A plurality of gear teeth 64d are formed on the upper surface of arcuate wall 64c, the purpose for which will be understood from the description hereafter.

Elongated body 62 has a hollow bore 62a (FIG. 40) which extends for a substantial distance along the length thereof. An upper opening 68 is provided at the upper end of enlarged head 64 and is in open communication with hollow bore 62a. An enlarged button recess 70 is provided on one side of shift/brake lever 60 at the upper portion of foot shaped lower end 66, and has a rectangular opening 72 in an inner wall thereof that is in open communication with hollow bore 62a.

Figures 22, 23:
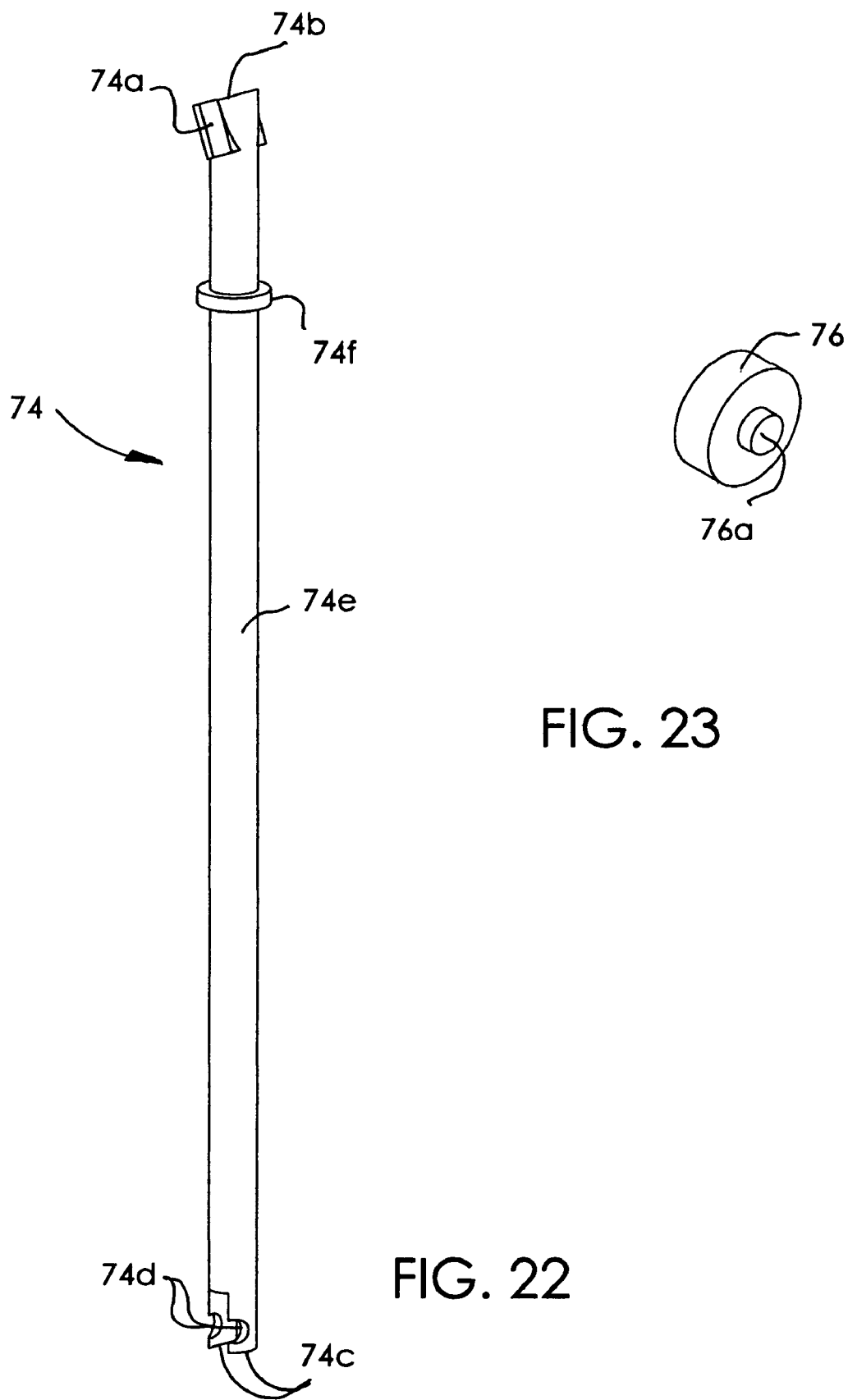
FIG. 22 is a perspective view of the plunger rod.
FIG. 23 is an enlarged perspective view of the roller wheel.
Figure 40:
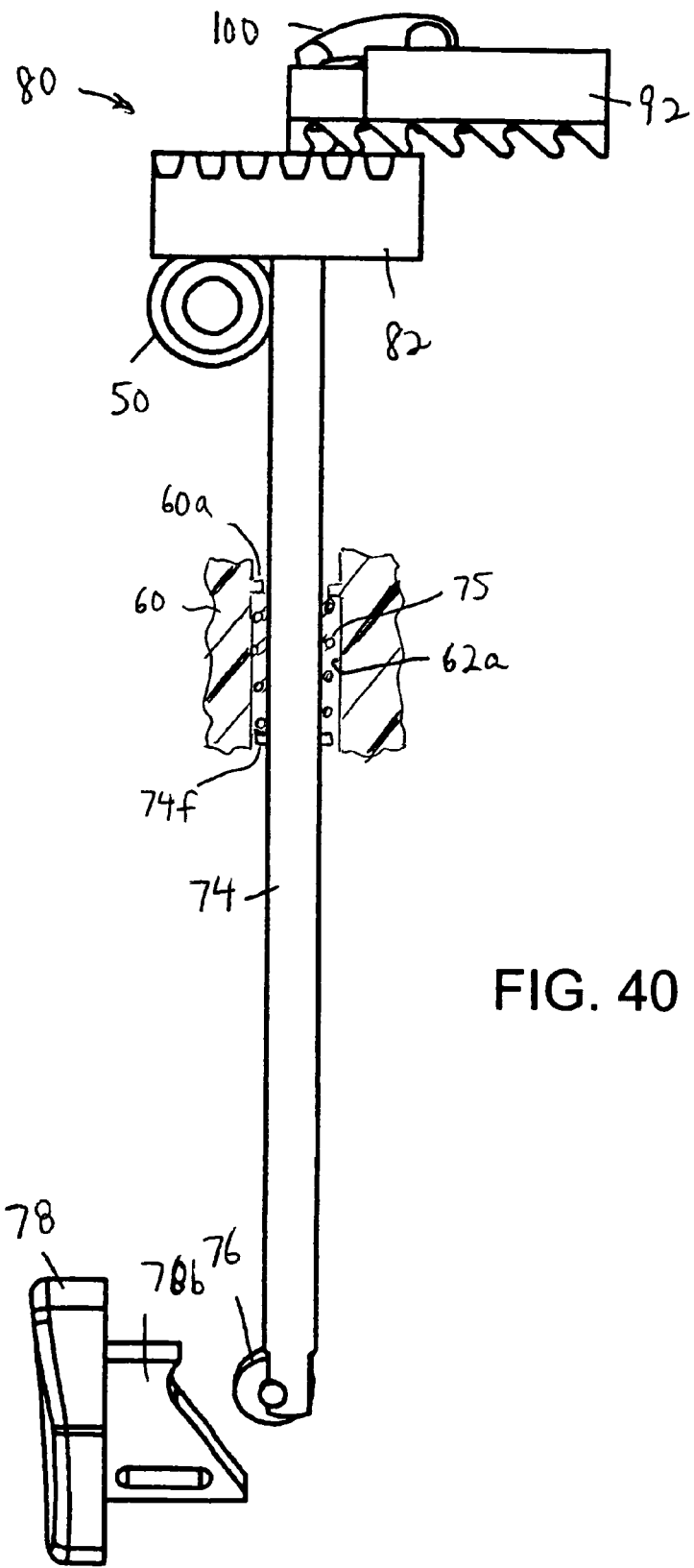
FIG. 40 is a perspective view similar to FIG. 36, but with the combination shift/brake lever removed.
Figure 41:
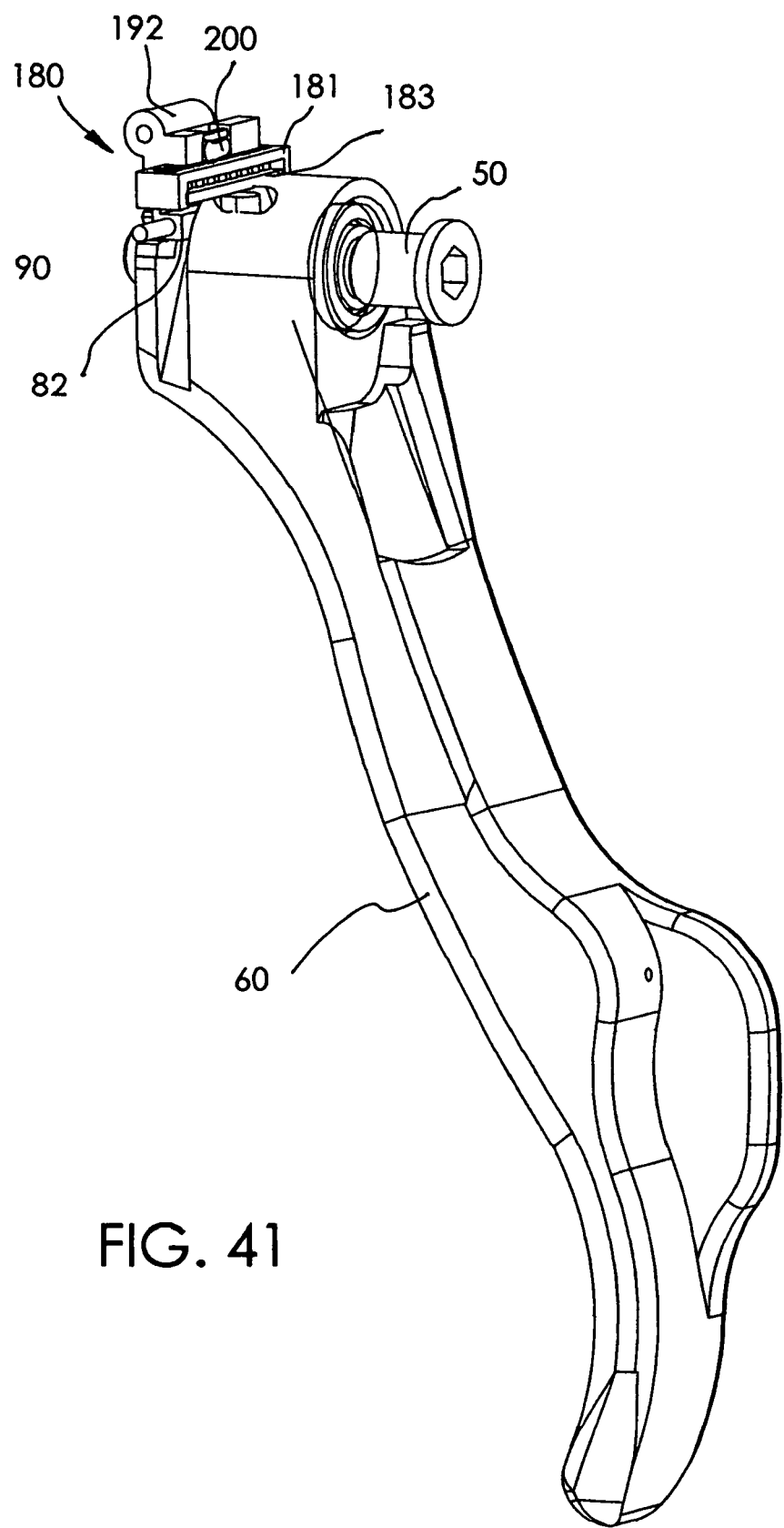
FIG. 41 is a perspective view of a combination shift and brake lever arrangement for a bicycle according to a second embodiment of the present invention, viewed from the rear thereof.
Figure 42:
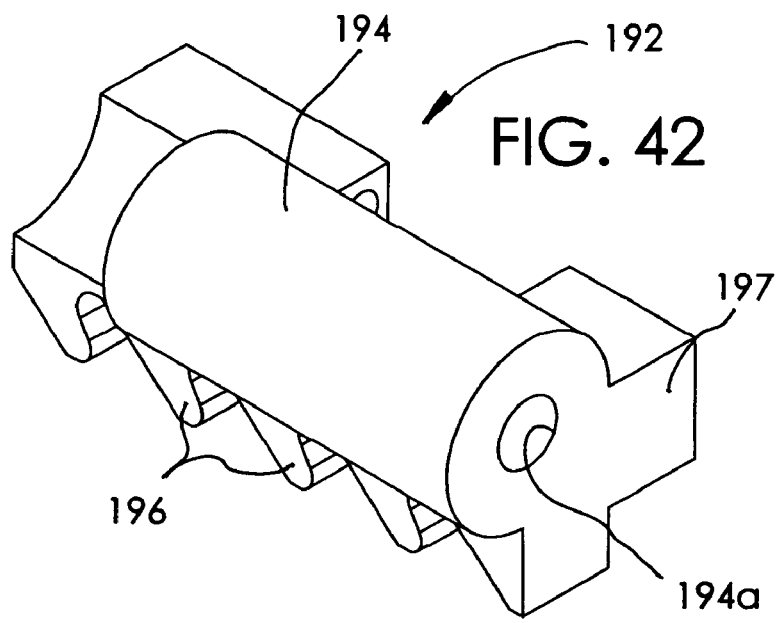
FIG. 42 is a left side perspective view of the cable carrier rack of the second embodiment.

A plunger rod 74 slidably extends through the hollow interior of shift/brake lever 60. As shown in FIG. 22, plunger rod 74 has an elongated shaft 74e with a slightly enlarged head 74a at the upper end thereof which includes a flat upper surface 74b that is angled relative to the longitudinal axis of shaft 74e of plunger rod 74, for example, at an angle of about 21 degrees. Enlarged head 74a of plunger rod 74 extends out through upper opening 68 at the upper end of enlarged head 64 of shift/brake lever 60. Plunger rod 74 has a bifurcated lower end 74c having arcuate grooves 74d therein for rotatably holding a roller wheel 76 (FIG. 23) by its roller axle 76a. Roller wheel 76 is accessible through rectangular opening 72. In addition, a linear coil spring 75 normally biases plunger rod 74 in a downward direction in shift/brake lever 60, and is captured between an outwardly directed circumferential flange 74f on plunger rod 74 and an inwardly directed circumferential flange 60a within interior bore 62a of shift/brake lever 60, as shown in FIG. 40.

Figure 24:
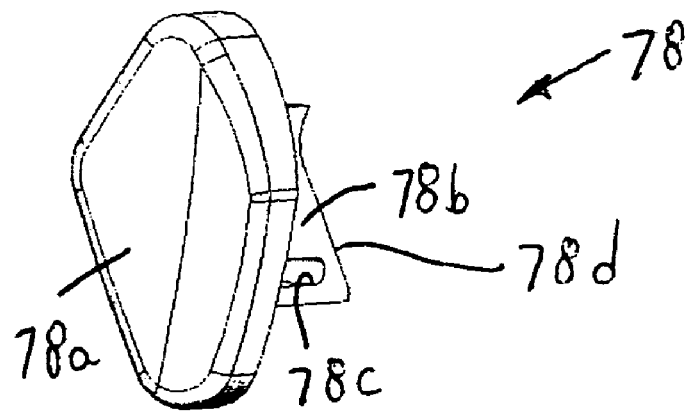
FIG. 24 is a front perspective view of the push button.
Figure 25:
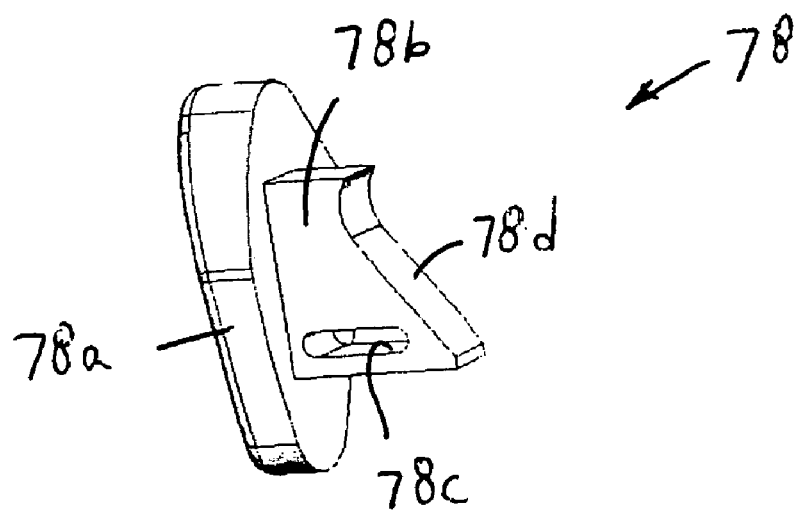
FIG. 25 is a rear perspective view of the push button.

A push button 78 is slidably mounted in enlarged button recess 70 of shift/brake lever 60. As shown in FIGS. 24 and 25, push button 78 includes a generally planar push plate 78a that has dimensions and a shape similar to those of enlarged button recess 70 for sliding movement into and out of enlarged button recess 70. A cam wall 78b extends orthogonally inwardly from planar push plate 78a and has an elongated slot 78c that receives a pin 71 (FIGS. 17 and 18) extending from a side wall of enlarged button recess 70 in order to slidably retain push button 78 in enlarged button recess 70. Cam wall 78b has an inwardly extending inclined or ramped camming surface 78d that engages with roller wheel 76. Thus, when push button 78 is pressed into enlarged button recess 70, camming surface 78d engages roller wheel 76 in such a manner that roller wheel 76 rides up camming surface 78d and thereby forces plunger rod 74 to move upwardly relative to shift/brake lever 60. Roller wheel 76 normally biases push button 78 in a direction out of enlarged button recess 70.

Figure 26:
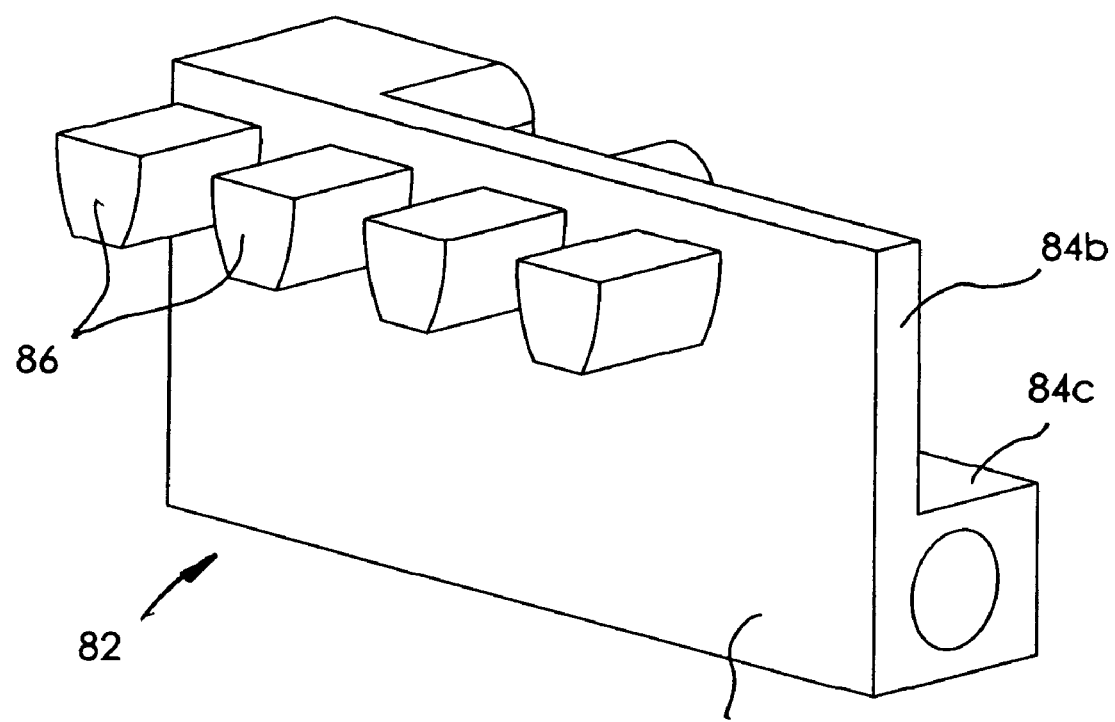
FIG. 26 is a perspective view of the actuating rack viewed from the left side.
Figure 27:
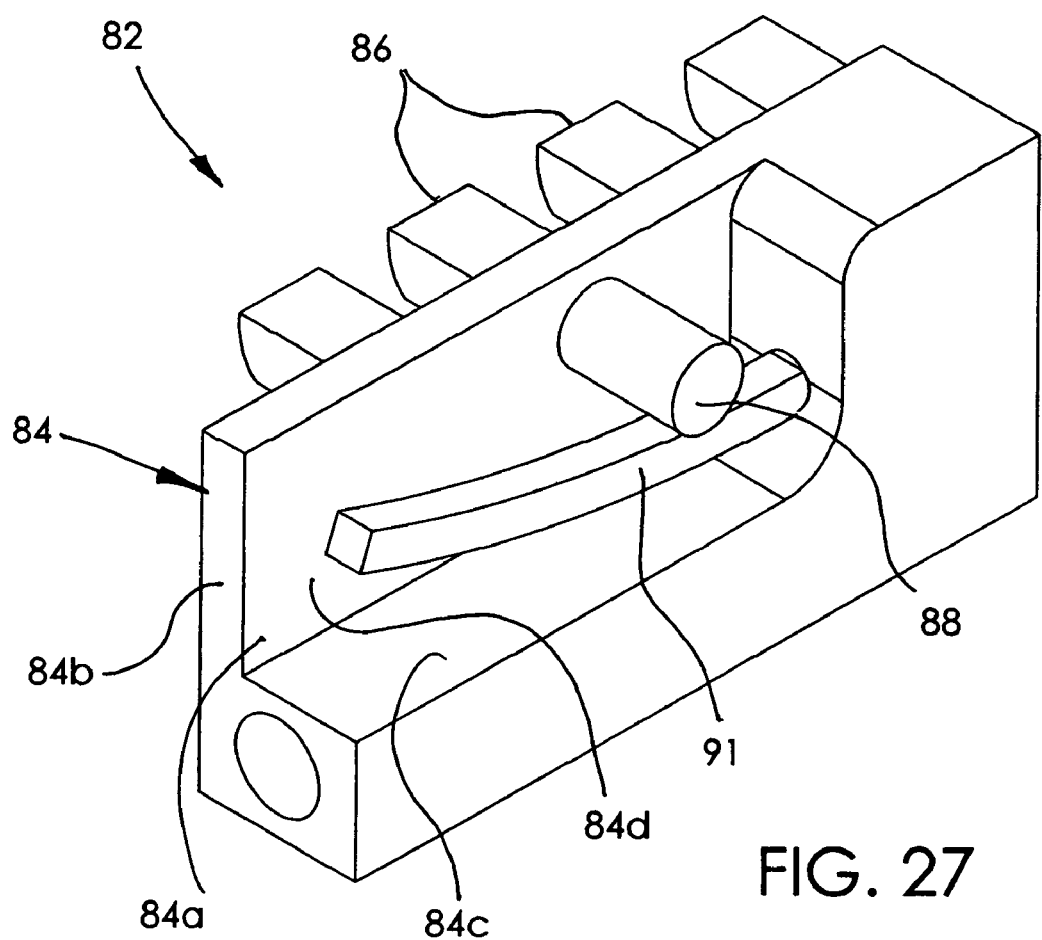
FIG. 27 is a perspective view of the actuating rack viewed from the right side.

In accordance with the present invention, a shift control mechanism 80 is provided which, as shown best in FIGS. 26 and 27, includes an elongated actuating rack 82 formed by a substantially rectangular block 84 having gear teeth 86 extending outwardly in a perpendicular manner from the upper end at the left side thereof. Rectangular block 84 is slidably held in lower rectangular guides 38b and 40b, and extends into transverse groove 64b of enlarged head 64 of shift/brake lever 60 for sliding movement therein. Gear teeth 86 engage with gear teeth 64d of enlarged head 64 of shift/brake lever 60. In this manner, when shift/brake lever 60 is rotated about pivot pin 50 against the force of torsion spring 31, gear teeth 64d which are engaged with gear teeth 86, slidably move actuating rack 82 in one direction from its neutral position.

Rectangular block 84 has a substantially rectangular cutaway section 84a at the side opposite to gear teeth 86. Cutaway section 84a extends about three-fourths of the way down from the upper edge and about two-thirds of the way from the edge 84b that extends out of transverse groove 64b, and is cut-away to a depth of about two-thirds the depth of rectangular block 84. Cut-away section includes a floor 84c. A post 88 extends out from a side wall 84d of cut-away section 84a at a position near the upper edge of rectangular block 84 and substantially midway along the length thereof.

Figure 28:
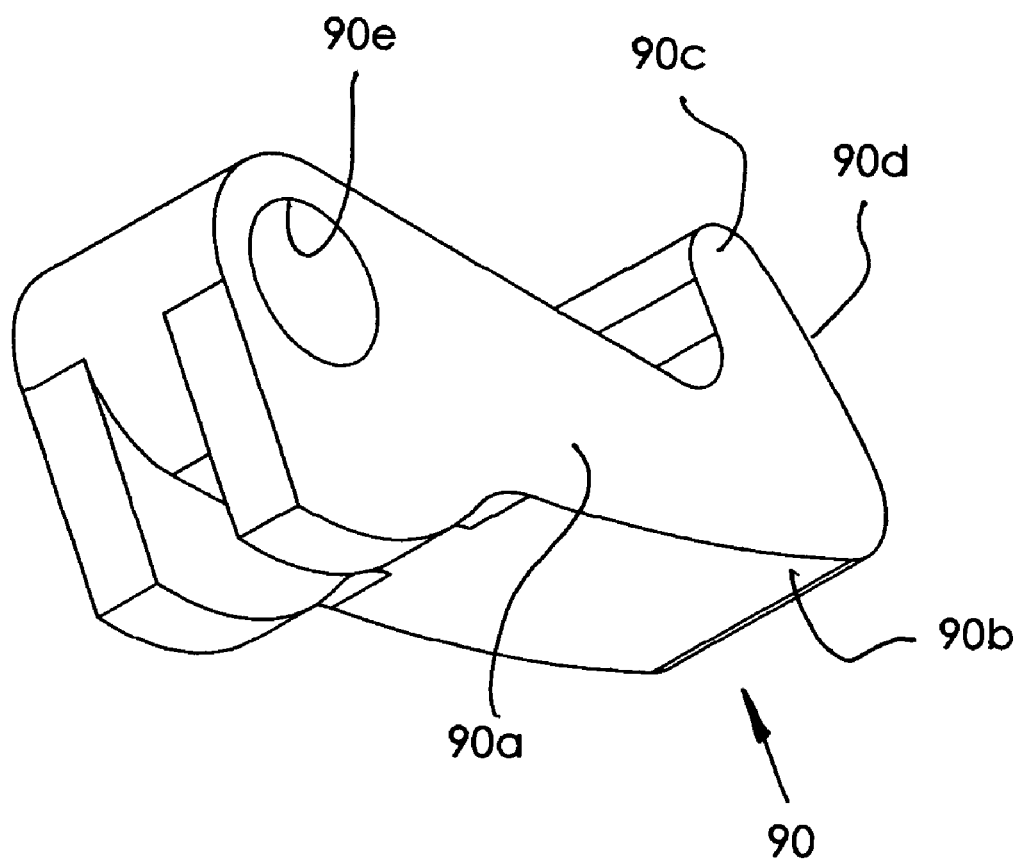
FIG. 28 is a perspective view of the carrier pull pawl.

A carrier pull pawl 90 shown best in FIG. 28 is rotatably mounted on post 88 of actuating rack 82. Carrier pull pawl 90 includes a pawl lever 90a having an opening 90e at one end thereof which is mounted on post 88. A leaf spring 91 (FIG. 27) is also associated with post 88 between actuating rack 82 and pawl lever 90a for normally biasing pawl lever 90a in an upward direction. The lower end surface 90b of pawl lever 90a is inclined at about 135 degrees from the lengthwise axis of pawl lever 90a in order to rest flush on the floor 84c of cut-away section 84a in the lowered position. An upwardly inclined pawl catch 90c is provided at the lower end 90b of pawl lever 90a for engaging with gear teeth to be described hereafter, and includes an upper inclined surface 90d.

Figure 35:
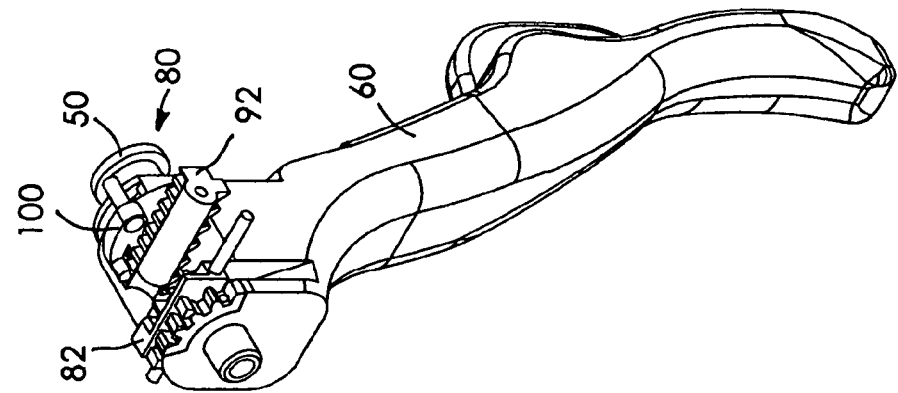
FIG. 35 is a perspective view showing the relation of the shift control mechanism relative to the combination shift/brake lever, viewed from the right side.
Figure 36:
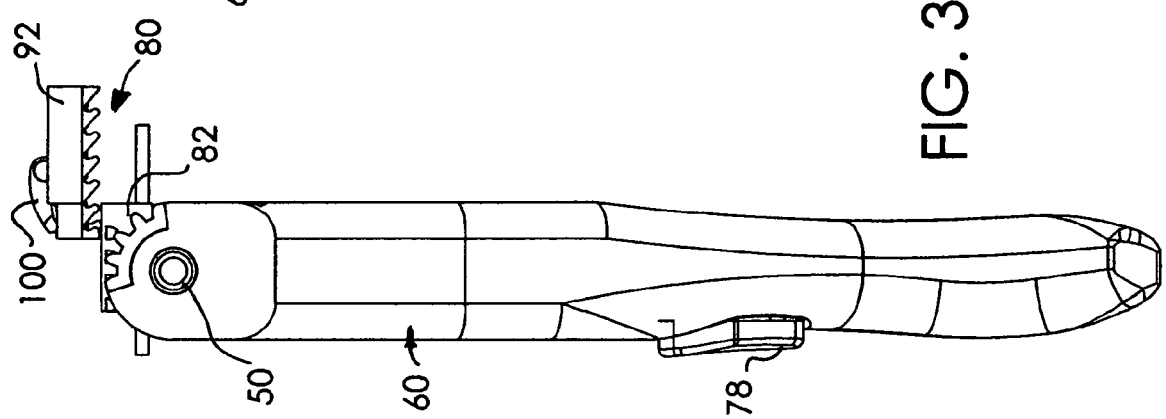
FIG. 36 is a front elevational view showing the relation of the shift control mechanism relative to the combination shift/brake lever.
Figure 34:
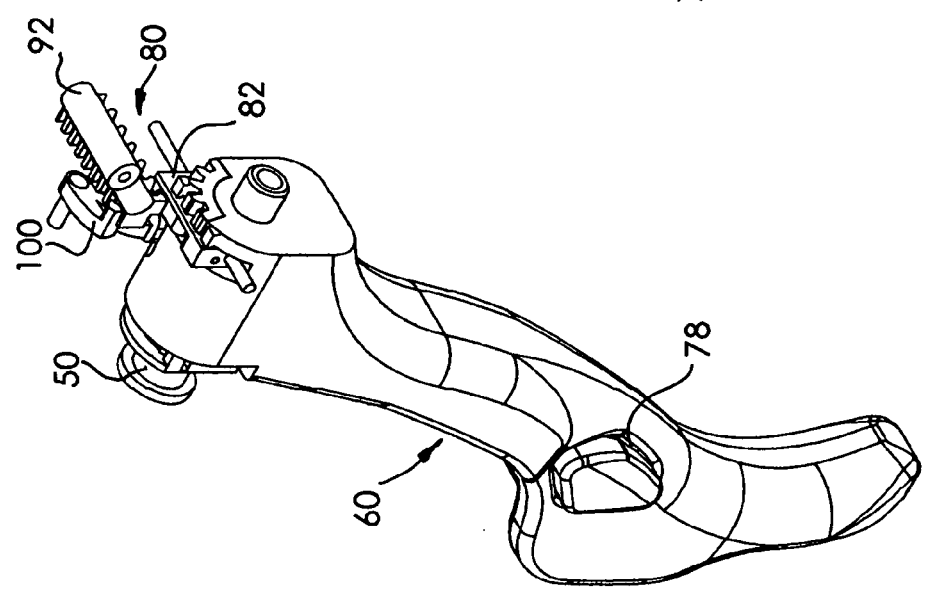
FIG. 34 is a perspective view showing the relation of the shift control mechanism relative to the combination shift/brake lever, viewed from the left side.
Figure 37:
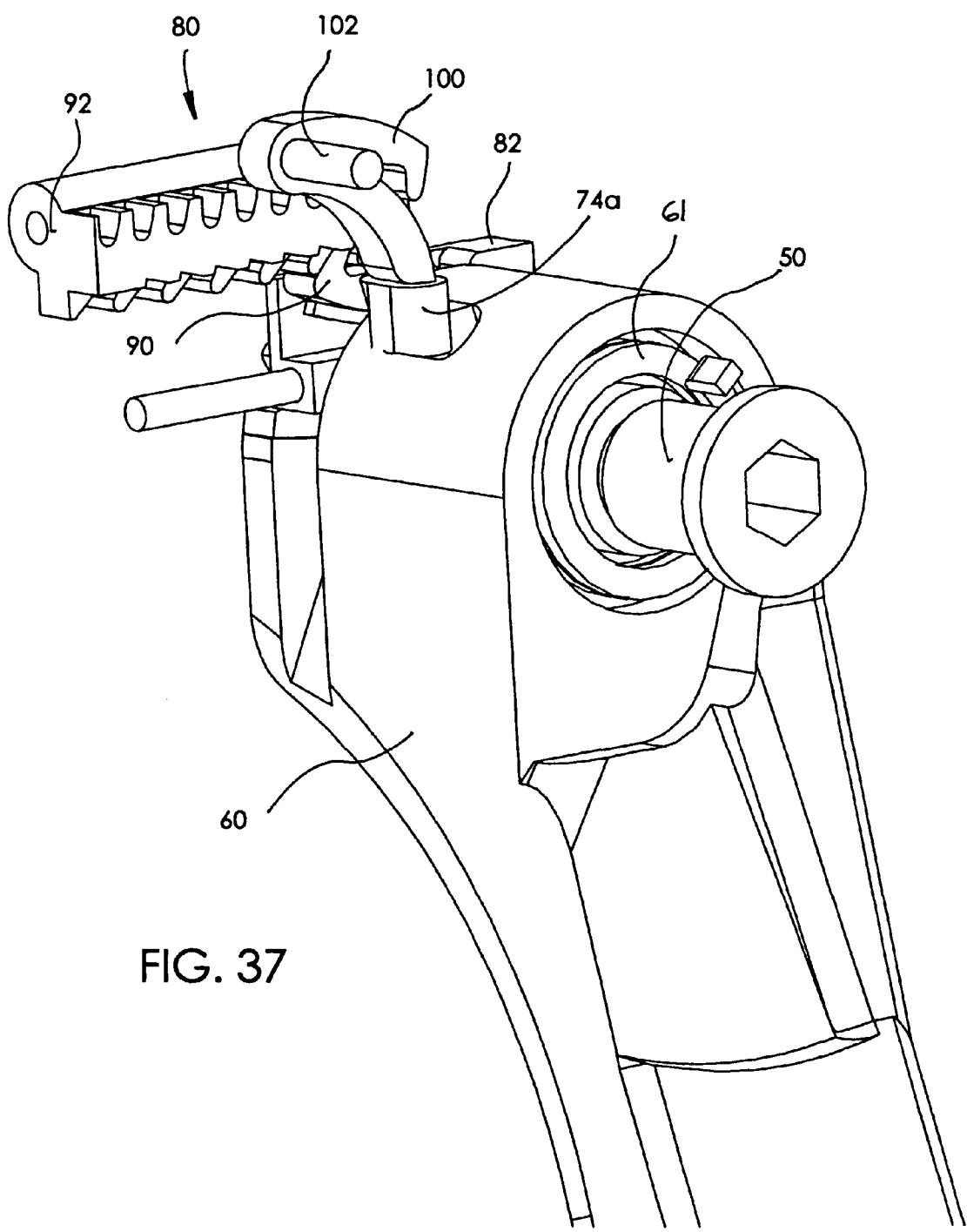
FIG. 37 is an enlarged perspective view of the upper portion of FIG. 35.
Figure 39:
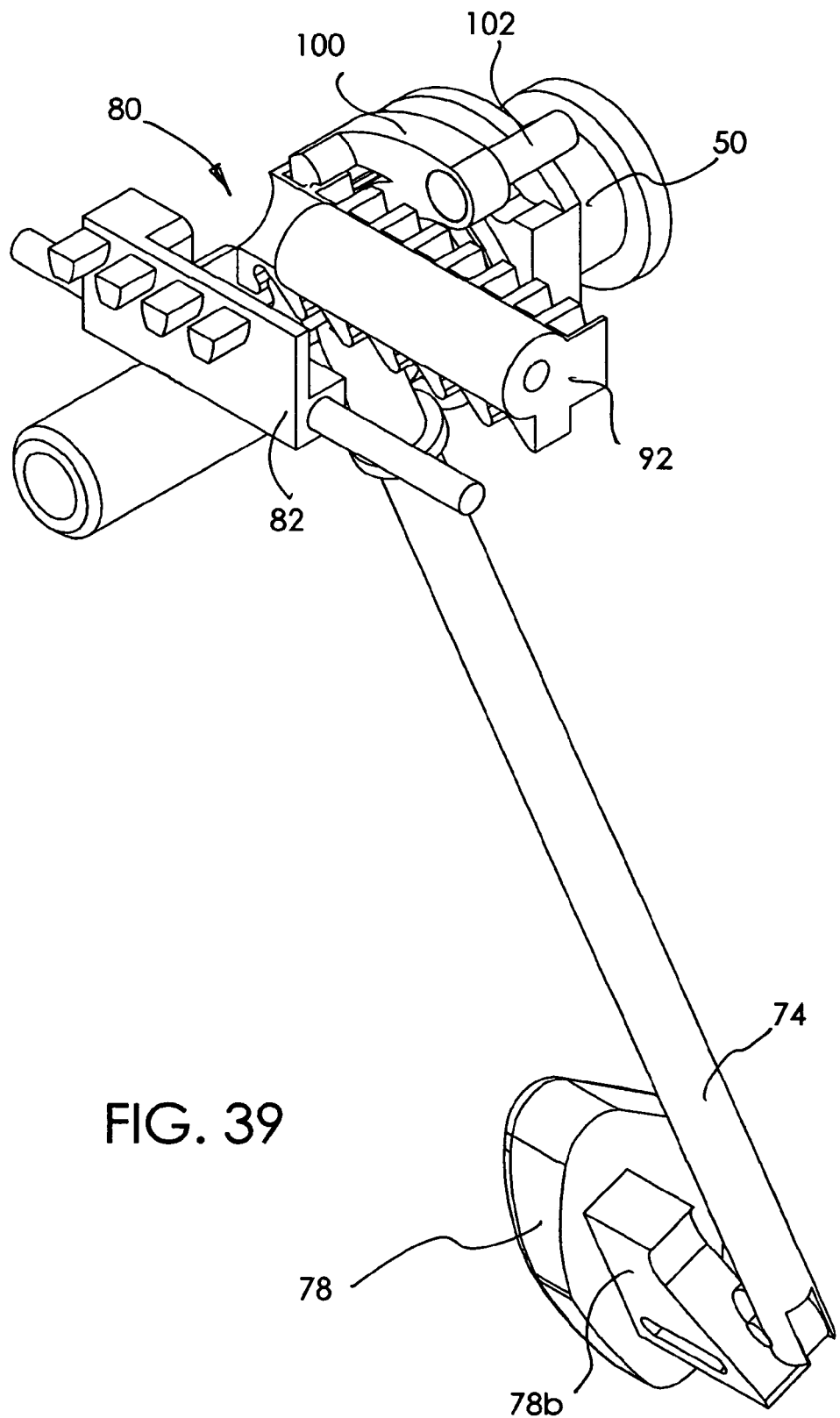
FIG. 39 is a perspective view similar to FIG. 35, but with the combination shift/brake lever removed.

In the neutral position of shift/brake lever 60, upwardly inclined surface 90d is engaged by hold down tab 58 of carrier housing 30. However, when shift/brake lever 60 is pivoted about pivot pin 50, gear teeth 64d of enlarged head 64 of shift/brake lever 60 engage with gear teeth 86 of actuating rack 82 to move actuating rack 82 in transverse groove 64b of enlarged head 64. As a result, carrier pull pawl 90 is no longer restrained by hold down tab 58, so that spring 91 associated therewith rotates pawl lever 90a about post 88 to move pawl catch 90c upwardly to engage gear teeth to be described hereafter. When the biasing force on shift/brake lever 60 is released, a torsion spring 61 (FIG. 35) associated therewith moves shift/brake lever 60 back to its neutral position. At this time, gear teeth 64d of of enlarged head 64 of shift/brake lever 60 engage with gear teeth 86 of actuating rack 82 to move actuating rack 82 back to its original position in transverse groove 64b of enlarged head 64, where inclined surface 58a of hold down tab 58 engages upwardly inclined surface 90d of pawl 90 to rotate pawl lever 90 in the opposite direction such that pawl catch 90c is moved down and lower end surface 90b is once again held on floor 84c of rectangular cut-away section 84a.

Figure 29:
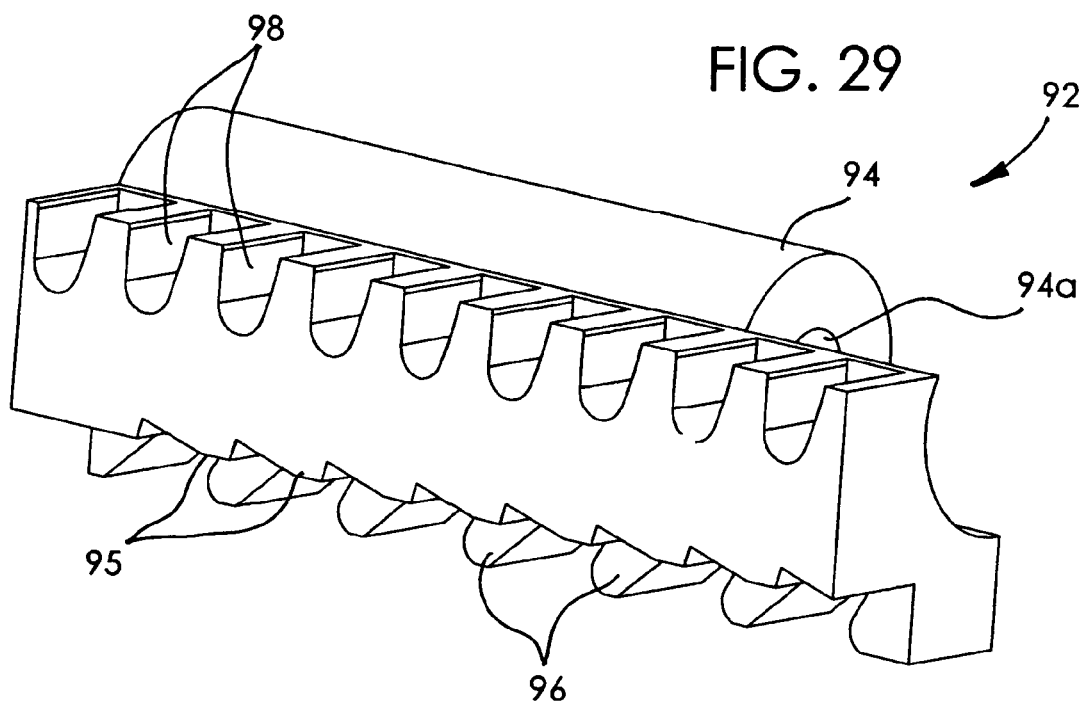
FIG. 29 is a perspective view of the cable carrier rack viewed from the left side.
Figure 30:
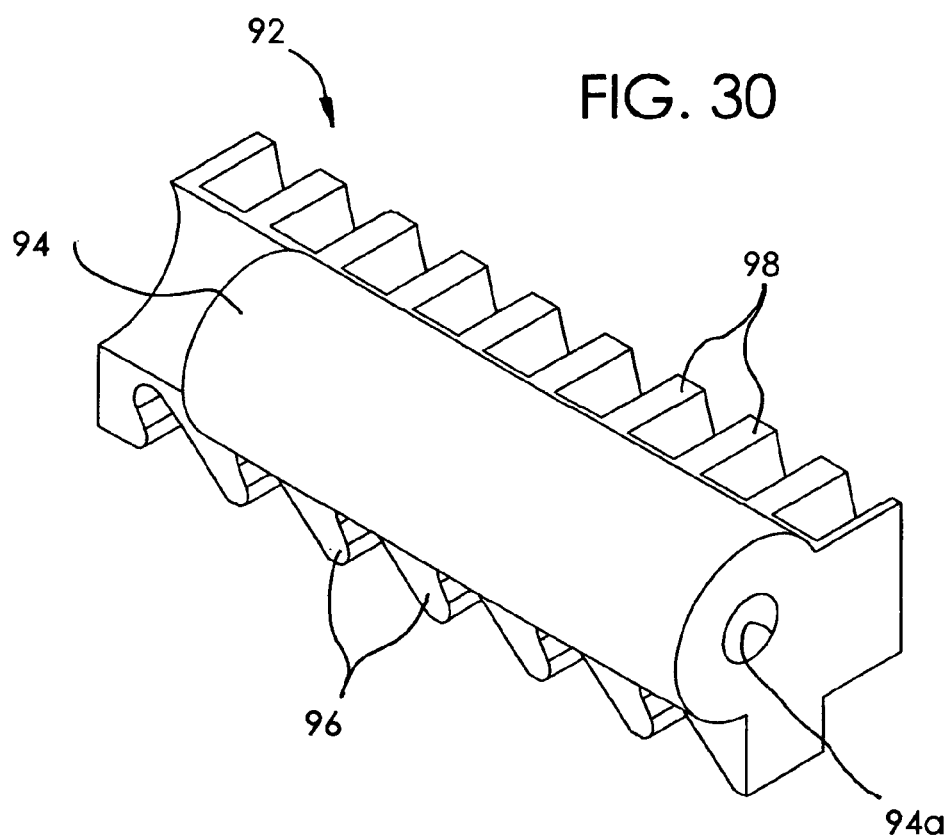
FIG. 30 is a perspective view of the cable carrier rack viewed from the right side.

Shift control mechanism 80 further includes an elongated cable-carrier rack 92, as best shown in FIGS. 29 and 30, slidably held in rear rectangular guides 38c and 40c. Cable carrier rack 92 is formed by a substantially cylindrical block 94 having a central through bore 94a. A shift cable (not shown) extends from a derailleur through tubular guide 52 and then through cylindrical block 94 where it is tied. As a result, movement of cable carrier rack 92 also results in movement of the shift cable in order to change gears 150 at the derailleur. Inclined gear teeth 96 extend downwardly from the lower side of cylindrical block 94, with gear teeth 96 having the same angle of inclination as pawl catch 90c and being adapted to be engaged by pawl catch 90c. Cable carrier rack 92 also includes upper gear teeth 98 on the opposite side thereof. Upper gear teeth 98 have a generally U-shaped cross-sectional profile. Cable carrier rack 92 further includes a second set of shallow lower gear teeth 95 directly below upper gear teeth 98 and which have an angle of inclination opposite to that of inclined gear teeth 96.

Figure 31:
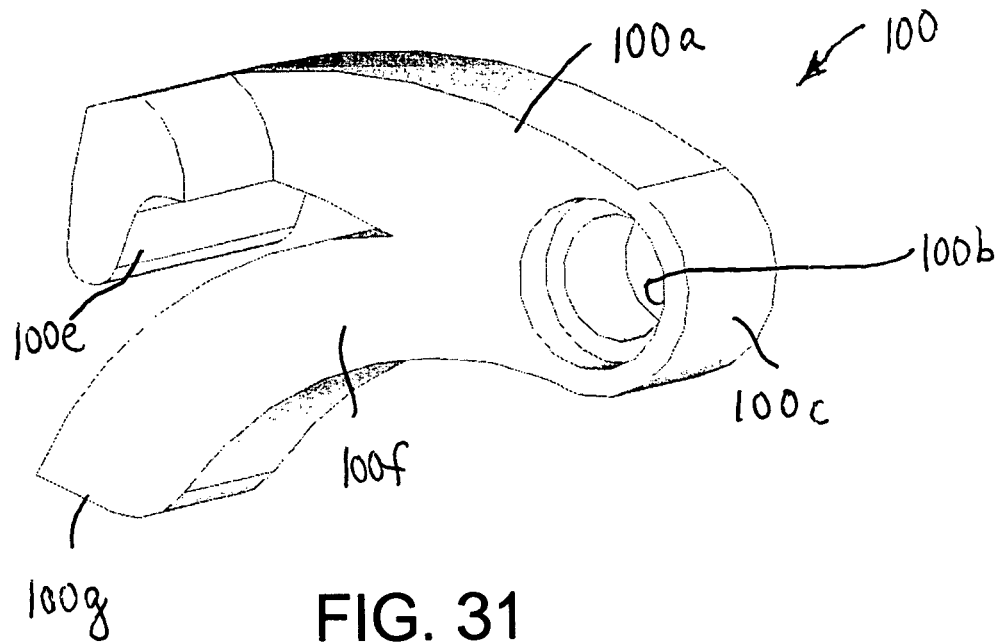
FIG. 31 is a perspective view of the cable carrier pawl viewed from the left side.
Figure 32:
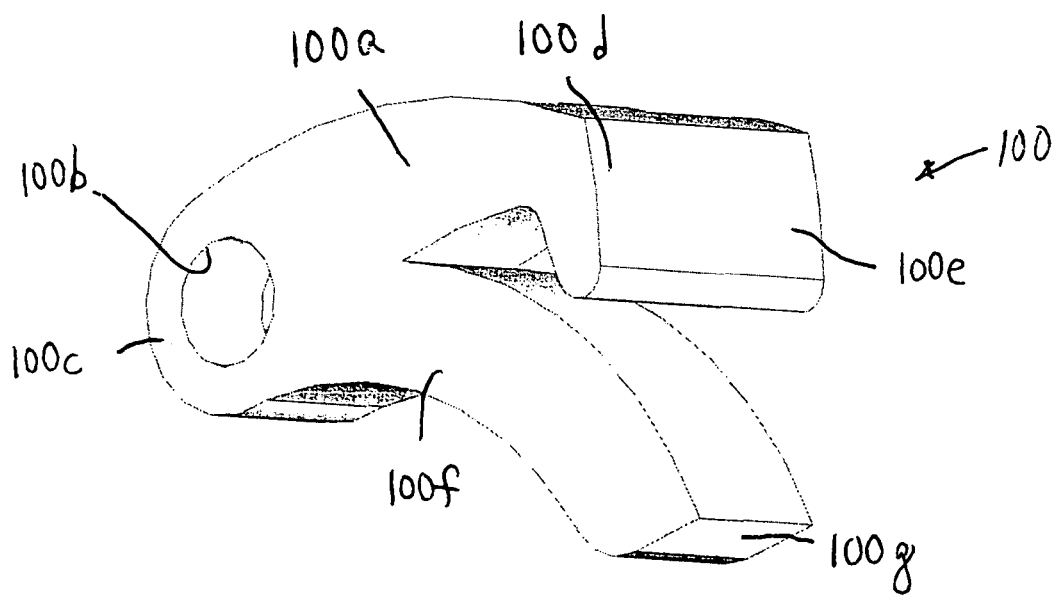
FIG. 32 is a perspective view of the cable carrier pawl viewed from the right side.

A cable carrier pawl 100, shown best in FIGS. 31 and 32, is provided for engaging upper gear teeth 98. Specifically, cable carrier pawl 100 includes a curved upper lever 100a having an opening 100b at one end 100c thereof which is fixedly mounted on a post 102. Alternatively, post 102 can be made an integral part of cable carrier pawl 100. A downwardly extending catch 100d is formed at the upper end of curved upper lever 100a and extends down therefrom at an angle of about 135 degrees. Catch 100d has a width about twice that of upper lever 100a so as to provide a laterally directed catch extension 100e extending outwardly therefrom. Cable carrier pawl 100 further includes a lower curved lever 100f which extends in the same direction as upper lever 100a from end 100c, but is positioned below upper lever 100a. Lower curved lever 100f has a free engagement end 100g.

Post 102 is rotatably mounted in small bore 56, and cable carrier pawl 100, and particularly upper lever 100a, catch 100d and catch extension 100e, are thereby mounted for movement in L-shaped cut-out area 54, such that catch extension 100e is positioned above upper gear teeth 98 of cable carrier rack 92 for engagement therewith. A torsion spring 101 (FIG. 38) is also mounted between carrier housing 30 and cable carrier pawl 100 for normally biasing catch extension 100e in a downward direction into engagement with upper gear teeth 98.

Further, in this arrangement, flat upper surface 74b of plunger rod 74 is positioned directly beneath free engagement end 100g of lower curved lever 100f of cable carrier pawl 100. When plunger rod 74 is pushed up, flat upper surface 74b pushes up free engagement end 100g, thereby rotating cable carrier pawl 100 in an upward direction opposite to the force of torsion spring 101. As a result, catch extension 100e disengages from upper gear teeth 98 to permit cable carrier rack 92 to be moved in its lengthwise direction.

The operation of combination shift and brake lever arrangement 10 will now be discussed in relation to FIGS. 33-43.

First, for a braking operation, when shift/brake lever 60 is grasped and pulled toward the person, carrier housing 30 is caused to pivot relative to main housing 12 around pivot pin 36. This results in a pulling of the brake cable connected to the yoke in carrier housing 30, and a resultant braking operation. Torsion spring 31 connected between main housing 12 and carrier housing 30 normally brings shift/brake lever 60 and carrier housing 30 back to a neutral position shown in FIG. 1A after a pivoting force which has been applied by the user thereto to perform a braking operation is removed.

Second, for a shifting operation, when a person pivots combination shift/brake lever 60 about pivot pin 50, gear teeth 64d of enlarged head 64 of shift/brake lever 60 engage with gear teeth 86 of actuating rack 82 to move actuating rack 82 in transverse groove 64b of enlarged head 64. As a result, carrier pull pawl 90 is no longer restrained by hold down tab 58, so that spring 91 associated therewith rotates pawl lever 90a about post 88 to move pawl catch 90c upwardly to engage inclined gear teeth 96 of cable carrier rack 92. As actuating rack 82 continues moving, carrier pull pawl 90 pulls cable carrier rack 92 with it. At this time, because of the U-shaped inclination of upper gear teeth 98 of cable carrier rack 92, this movement of cable carrier rack 92 forces catch extension 100e of cable carrier pawl 100 out of engagement with its then engaged upper gear tooth 98 and into engagement with the next upper gear tooth 98.

When the biasing force on shift/brake lever 60 is released, torsion spring 61 associated therewith moves shift/brake lever 60 back to its neutral position. At this time, gear teeth 64d of enlarged head 64 of shift/brake lever 60 engage with gear teeth 86 of actuating rack 82 to move actuating rack 82 back to its original position in transverse groove 64b of enlarged head 64. Because of the inclination of gear teeth 96, pawl catch 90c of pawl 90 rides over teeth 96 in a ratchet like manner until shift/brake lever 60 returns to its neutral unbiased position where inclined surface 58a of hold down tab 58 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 96. However, at this time, cable carrier rack 92 has already moved the distance of one gear, where it is locked in position by catch extension 100e. As a result of this operation, cable carrier rack 92 has been moved by a distance of one tooth 98 which changes the tension on the shift cable, causing a change of one gear at the respective derailleur.

Third, to provide a reverse shifting operation, push button 78 is depressed. As a result, camming surface 78d engages roller wheel 76 to push plunger rod 74 up against the force of the linear coil spring 75 associated therewith. Flat upper surface 74b of plunger rod 74 engages free engagement end 100g of cable carrier pawl 100. At this time, flat upper surface 74b of plunger rod 74 just barely engages or "kisses" free engagement end 100g, but not sufficient to pivot cable carrier pawl 100 about the axis of post 102 on which it is mounted. Then, with push button 78 still depressed, shift/brake lever 60 is again pivoted about pivot pin 50. It is this action that moves flat upper surface 74b of plunger rod 74 at an angle, and results in flat upper surface 74b engaging free engagement end 100g so as to pivot cable carrier pawl 100 about the axis of post 102 on which it is mounted. This results in catch extension 100e disengaging from upper gear teeth 98 of cable carrier rack 92.

The tension on the shift cable connected to cable carrier rack 92 results in cable carrier rack 92 being moved in the reverse direction. However, the pivoting action of shift/brake lever 60 also results in flat upper surface 74b engaging lower gear teeth 95 just after cable carrier rack 92 has moved back one gear in order to hold cable carrier rack 92 in this position. This engagement occurs just at the time that cable carrier rack 92 moves back one tooth.

Since shift/brake lever 60 is again pivoted about pivot pin 50, carrier pull pawl 90 is again freed from hold down tab 58. Thus, as cable carrier rack 92 moves back, spring 91 forces pawl catch 90c into engagement with the previous lower inclined gear tooth 96. However, because of the reverse direction of movement of cable carrier rack 92, carrier pull pawl 90 can ride over inclined gear teeth 96 in a ratchet like manner.

Then, push button 78 is released so that plunger rod 74 falls down and no longer engages free engagement end 100g of cable carrier pawl 100 and no longer engages lower gear teeth 95. This results in catch extension 100e being pivoted down into engagement with a new upper tooth 98 of cable carrier rack 92 which results in a changing of the derailleur gear to a different gear. Thus, as lower gear teeth 95 are released by plunger rod 74, upper gear teeth 98 are again engaged by catch extension 100e.

When the biasing force on shift/brake lever 60 is released, torsion spring 61 associated therewith moves shift/brake lever 60 back to its neutral position. At this time, gear teeth 64d of enlarged head 64 of shift/brake lever 60 engage with gear teeth 86 of actuating rack 82 to move actuating rack 82 back to its original position in transverse groove 64b of enlarged head 64 where inclined surface 58a of hold down tab 58 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 96. However, at this time, cable carrier rack 92 has already moved the reverse distance of one gear, where it is locked in position by catch extension 100e. As a result of this operation, cable carrier rack 92 has been moved by a distance of one tooth 98 which changes the tension on the shift cable, causing a reverse change of one gear at the respective derailleur.

It will therefore be appreciated that a single lever is provided for the three functions of braking, shifting gears in a first direction and shifting gears in a second opposite direction, thereby greatly simplifying the exposed construction and the operation thereof, and that the pivoting direction of the lever is the same for both forward and reverse shifting operations.

It will be appreciated that various modifications can be made to the present invention, within the scope of the claims. For example, rather than a push button 78 with a camming surface 78d that engages a roller wheel 76, any other suitable mechanism can be used. A first example is that push button 78 can be connected to plunger rod 74 through a linkage or a lever arm. Alternatively, roller wheel 76 can be eliminated so that camming surface 78d directly engages the lower end of plunger rod 74, for example, with a wedge shaped action.

Further, although shift control mechanism 80 has been shown by pawls and racks, other internal shift control mechanisms can be used, for example, electronic, pneumatic or hydraulic.

Referring now to FIGS. 41-52, a shift control mechanism 180 according to a second embodiment of the present invention will now be discussed, in which elements corresponding to shift control mechanism 80 of the first embodiment are identified by the same reference numerals, but augmented by 100.

Specifically, shift control mechanism 80 includes a combination shift/brake lever 60, plunger rod 74, push button 78, actuating rack 82 and carrier pull pawl 90 which are identical with the corresponding elements of shift control mechanism 80 and are therefore numbered the same. Accordingly, a detailed discussion thereof will be omitted for the sake of brevity.

Cable carrier rack 192, on the other hand, differs from cable carrier rack 92 by the omission of lower gear teeth 95 and upper gear teeth 98. Cable carrier rack 192 is slidably held in rear rectangular guides 38c and 40c. As shown best in FIGS. 42 and 43, cable carrier rack 192 is formed by a substantially cylindrical block 194 having a central through bore 194a. A shift cable (not shown) extends from a derailleur through tubular guide 52 and then through cylindrical block 194 where it is tied. As a result, movement of cable carrier rack 192 also results in movement of the shift cable in order to change gears at the derailleur. Inclined gear teeth 196 extend downwardly from the lower side of cylindrical block 194, with gear teeth 196 having the same angle of inclination as the pawl catch 90a of pawl 90 and being adapted to be engaged by the pawl catch 90a of pawl 90. Cable carrier rack 192 also includes a rectangular parallelepiped block 197 on the opposite side thereof, which has a cut-out area 197a through which a transverse opening 192a is exposed.

Figure 44:
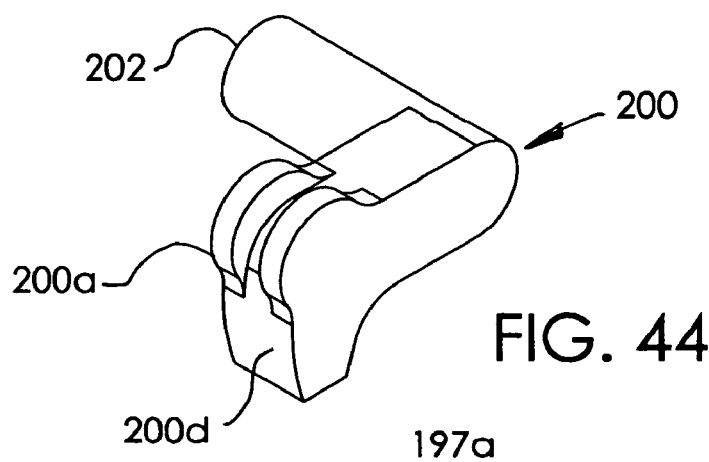
FIG. 44 is a perspective view of the cable carrier pawl of the second embodiment.
Figure 43:
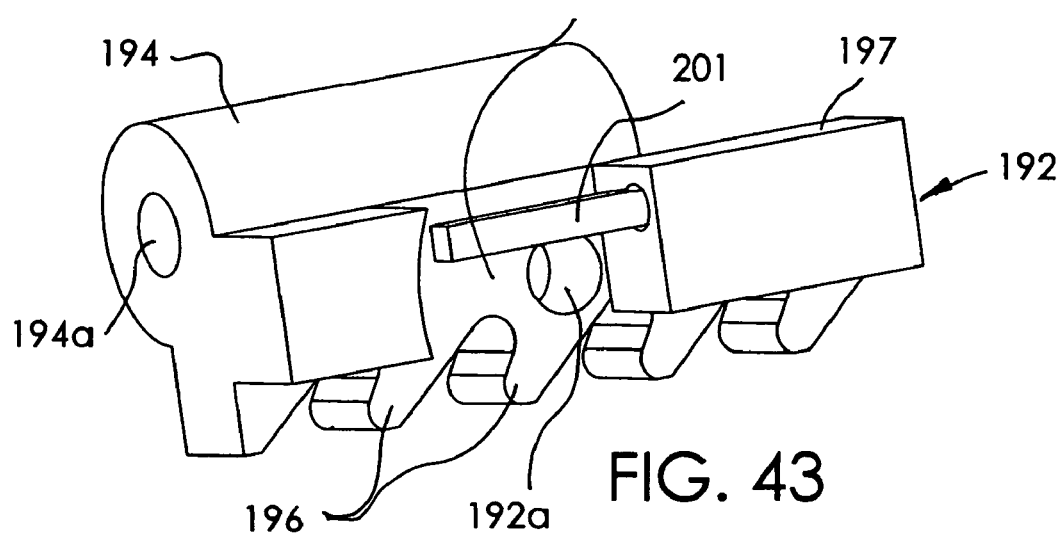
FIG. 43 is a right side perspective view of the cable carrier rack of FIG. 42.

A cable carrier pawl 200, shown best in FIG. 44, is rotatably mounted in transverse opening 192a. Cable carrier pawl 200 includes a curved lever 200a having a post 202 integrally fixed at one end thereof. A downwardly extending catch 200d is formed at the upper end of curved upper lever 200a and extends down therefrom at an angle of about ninety degrees. Post 202 is rotatably mounted in transverse opening 192a of cable carrier rack 192 such that curved lever 200a is positioned within cut-out area 197a. A torsion spring 201 (FIG. 44) is also mounted around post 202 for connection between cable carrier rack 192 and cable carrier pawl 200 for normally biasing catch 200d in a downward direction into engagement with teeth to be described hereafter.

Figure 45:
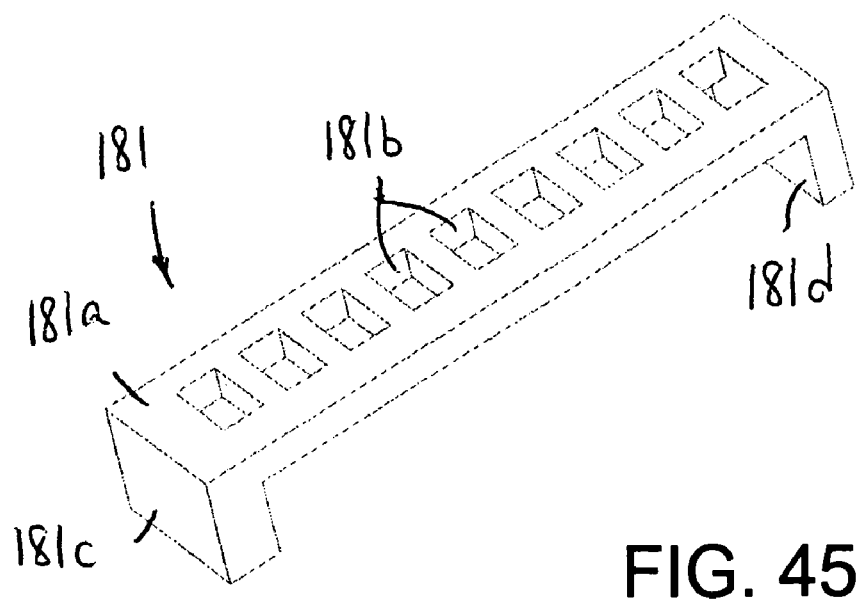
FIG. 45 is a perspective view of the pawl index grate.

In accordance with the second embodiment, shift control mechanism 180 includes a pawl index grate 181, shown best in FIG. 45, formed by a rectangular plate 181a having a plurality of rectangular openings 181b evenly spaced therealong, and a opposite legs 181c and 181d which are fixed in carrier housing 30 such that openings 181b are positioned immediately below rectangular parallelepiped block 197 and cable carrier pawl 200. In this manner, catch 200d can extend into engagement with one opening 181b to lock cable carrier rack 192 in position corresponding to a desired bicycle gear.

Figure 46:
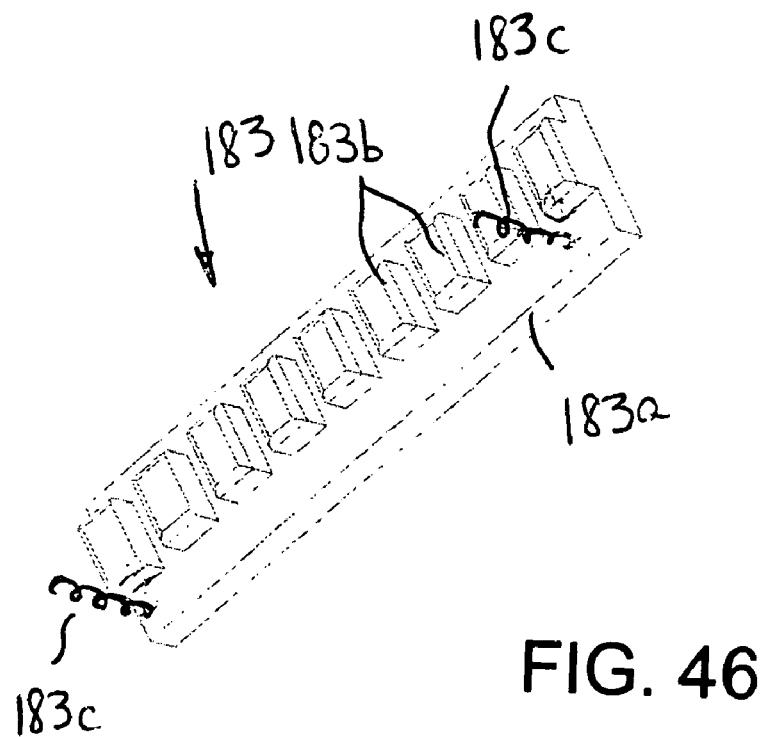
FIG. 46 is a perspective view of the pawl grate release.
Figure 48:
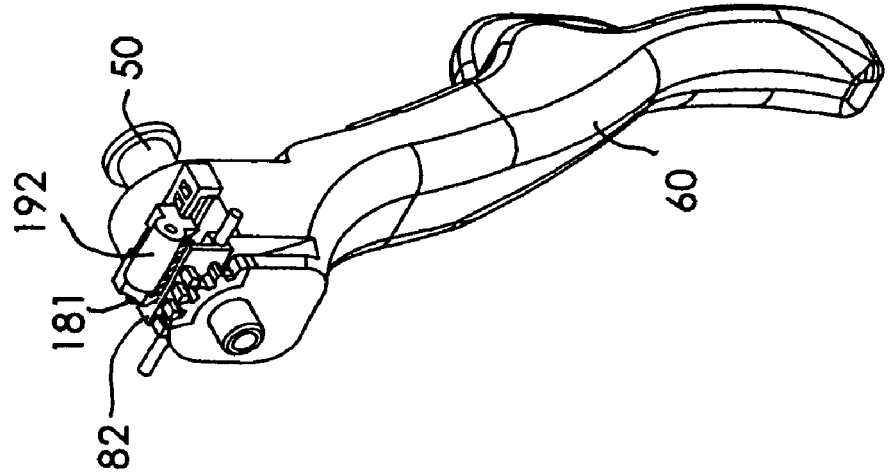
FIG. 48 is a perspective view showing the relation of the shift control mechanism of the second embodiment relative to the combination shift/brake lever, viewed from the right side.
Figure 49:
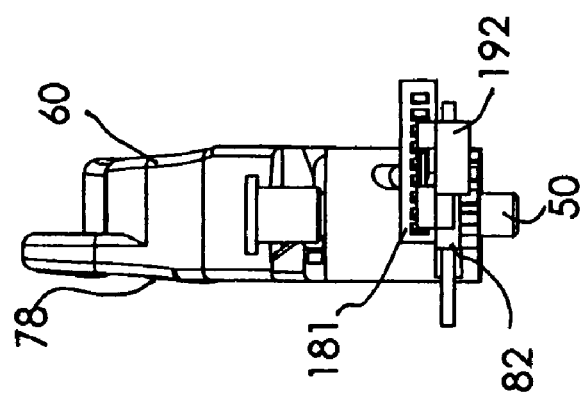
FIG. 49 is a top plan view showing the relation of the shift control mechanism of the second embodiment relative to the combination shift/brake lever.
Figure 47:
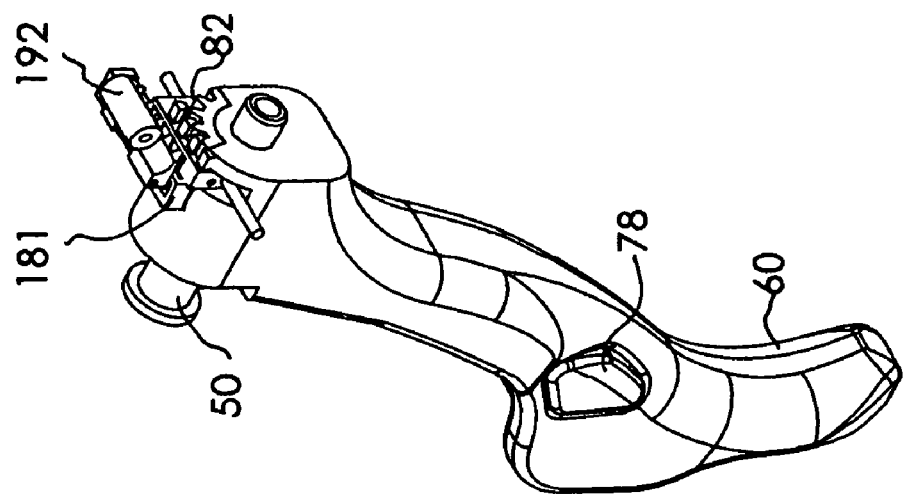
FIG. 47 is a perspective view showing the relation of the shift control mechanism of the second embodiment relative to the combination shift/brake lever, viewed from the left side.
Figure 51:
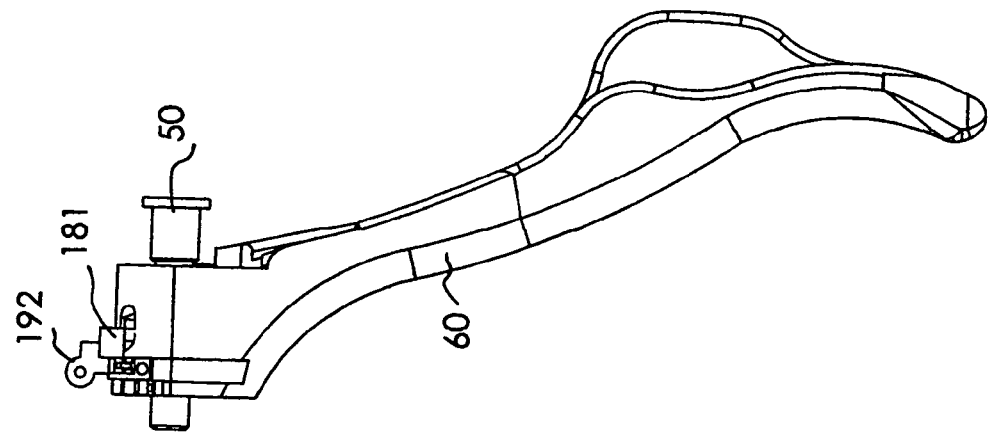
FIG. 51 is a right side elevational view showing the relation of the shift control mechanism of the second embodiment relative to the combination shift/brake lever, viewed from the right side.
Figure 52:
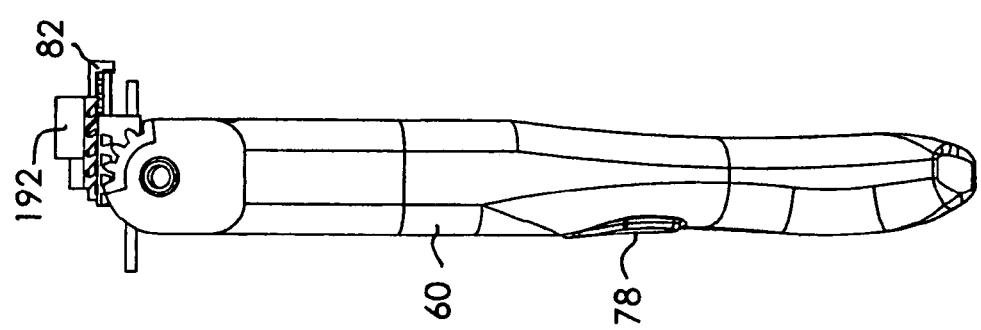
FIG. 52 is a front elevational view showing the relation of the shift control mechanism of the second embodiment relative to the combination shift/brake lever, viewed from the right side.
Figure 50:
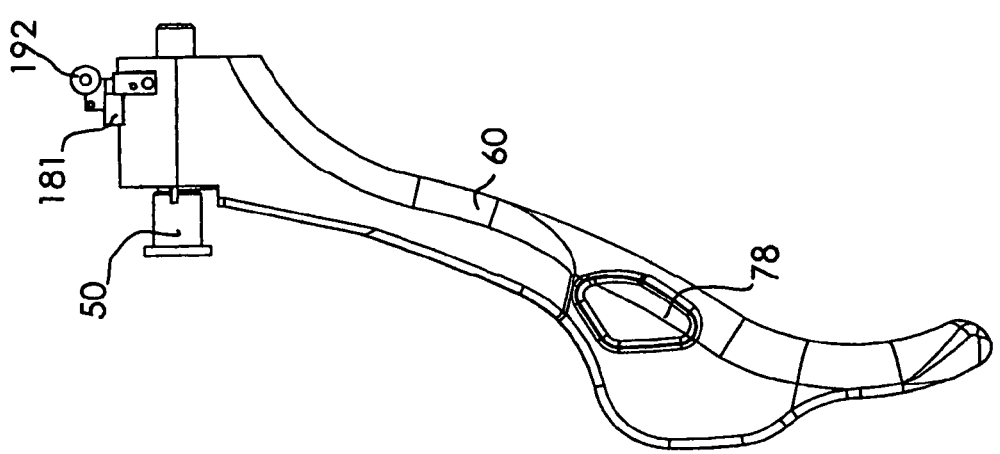
FIG. 50 is a left side elevational view showing the relation of the shift control mechanism of the second embodiment relative to the combination shift/brake lever, viewed from the right side.

A pawl grate release 183 shown in FIG. 46 is formed by a rectangular plate 183a having a plurality of rectangular parallelepiped projections 183b evenly spaced thereon, with the same spacing, shape and dimensions as openings 181b so as to fit therein. The height of each projection 183b is greater than the height of each opening 181b so as to project above the upper surface of plate 181a when positioned therein. Rectangular plate 183a is positioned immediately above slightly enlarged head 74a of plunger rod 74, and immediately below pawl index grate 181, with coil springs 183c at opposite ends and in engagement with pawl index grate 181 for normally biasing pawl grate release 183 away from pawl index grate 181.

The braking operation is the same as the first embodiment.

For a shifting operation, when a person pivots combination shift/brake lever 60 about pivot pin 50, gear teeth 64d of enlarged head 64 of shift/brake lever 60 engage with gear teeth 86 of actuating rack 82 to move actuating rack 82 in transverse groove 64b of enlarged head 64. As a result, carrier pull pawl 90 is no longer restrained by hold down tab 58, so that spring 91 associated therewith rotates pawl lever 90a about post 88 to move pawl catch 90c upwardly to engage inclined gear teeth 196 of cable carrier rack 192. As actuating rack 82 continues moving, carrier pull pawl 90 pulls cable carrier rack 192 with it. This movement of cable carrier rack 192 forces catch 200d of cable carrier pawl 200 out of engagement with its then engaged opening 181b of pawl index grate 181, riding up over pawl index grate 181 and into engagement with the next opening 181b. The inclinations of the walls of openings 181b and catch 200d are arranged to provide for such movement, in a similar manner to downwardly extending catch 100d and upper gear teeth 98 of the first embodiment.

When the biasing force on shift/brake lever 60 is released, torsion spring 61 associated therewith moves shift/brake lever 60 back to its neutral position. At this time, gear teeth 64d of enlarged head 64 of shift/brake lever 60 engage with gear teeth 86 of actuating rack 82 to move actuating rack 82 back to its original position in transverse groove 64b of enlarged head 64. Because of the inclination of gear teeth 196, pawl catch 90c of pawl 90 rides over teeth 196 in a ratchet like manner until shift/brake lever 60 returns to its neutral unbiased position where inclined surface 58a of hold down tab 58 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 196. However, at this time, cable carrier rack 192 has already moved the distance of one gear, where it is locked in position by catch 200d. As a result of this operation, cable carrier rack 192 has been moved by a distance to change the tension on the shift cable, causing a change of one gear at the respective derailleur.

To provide a reverse shifting operation, push button 78 is depressed. As a result, camming surface 78d engages roller wheel 76 to push plunger rod 74 up against the force of the linear coil spring 75 associated therewith. Flat upper surface 74b of plunger rod 74 engages the lower surface of pawl grate release 183. At this time, flat upper surface 74b of plunger rod 74 just barely engages or "kisses" pawl grate release 183, but not sufficient to move pawl grate release 183 upwardly. Then, with push button 78 still depressed, shift/brake lever 60 is pivoted about pivot pin 50. It is this action that moves flat upper surface 74b of plunger rod 74 at an angle, and results in flat upper surface 74b engaging pawl grate release 183 to move pawl grate release 183 upwardly such that rectangular parallelepiped projections 183b thereof enter rectangular openings 181b of pawl index grate 181. As a result, catch 200d of cable carrier pawl 200 is contacted by the upper surface of a projection 183b and is moved out of its respective opening 181b about the axis of post 202 on which it is mounted.

The tension on the shift cable connected to cable carrier rack 192 results in cable carrier rack 192 being moved in the reverse direction. However, rectangular parallelepiped projections 183b are pushed up such that upper surfaces thereof extend above the upper surface of rectangular plate 181a. Thus, as cable carrier rack 192 moves back, catch 200d of cable carrier pawl 200 rides over the top of the upper surface of the respective pushing projection 183b. Once it passes the respective pushing projection 183b, it is biased down again by torsion spring 201 so that it engages the side edge of the next projection 183b which extends above the upper surface of rectangular plate 181a, to prevent further movement of cable carrier rack 192.

Since shift/brake lever 60 is again pivoted about pivot pin 50, carrier pull pawl 90 is again freed from hold down tab 58. Thus, as cable carrier rack 92 moves back, spring 91 forces pawl catch 90c into engagement with the previous lower inclined gear tooth 96. However, because of the reverse direction of movement of cable carrier rack 92, carrier pull pawl 90 can ride over inclined gear teeth 96 in a ratchet like manner.

Then, push button 78 is released so that plunger rod 74 falls down and no longer engages pawl grate release 183. Springs 183c then force pawl grate release 183 down and out of engagement with pawl index grate 181. At this time, catch 200d is no longer held by the side edge of a projection 183b of pawl grate release 183. This results in catch 200d being pivoted down into engagement with the next opening 181b of pawl index grate 181 as cable carrier rack 92 is further moved back. This results in a reverse changing of the derailleur gear to a different gear.

When the biasing force on shift/brake lever 60 is released, torsion spring 61 associated therewith moves shift/brake lever 60 back to its neutral position. At this time, gear teeth 64d of enlarged head 64 of shift/brake lever 60 engage with gear teeth 86 of actuating rack 82 to move actuating rack 82 back to its original position in transverse groove 64b of enlarged head 64 where inclined surface 58a of hold down tab 58 once again engages upwardly inclined surface 90d of pawl 90 to rotate pawl lever 90 down in the opposite direction such that lower end surface 90b once again rests on floor 84c of rectangular cut-away section 84a. However, at this time, cable carrier rack 92 has already moved the reverse distance of one gear, where it is locked in position by catch 200d. As a result of this operation, cable carrier rack 92 has been moved by a distance which changes the tension on the shift cable, causing a reverse change of one gear at the respective derailleur.

It will be appreciated that, while shifting has been discussed as moving one gear at a time by pivoting action of shift/brake lever 60, the gear ratio can be such that movement of shift/brake lever 60 by a fraction of its pivotal movement, for example, one-third of its full pivotal movement, changes one gear, movement by two-thirds of its full pivotal movement changes two gears, and movement to its full pivotal extent changes three gears.

Although the present invention has been discussed above in regard to a mechanical shift lever, it could also be used with shift levers that are actuated by hydraulic, pneumatic or electric operation. In such case, the single lever would actuate a pneumatic valve, a hydraulic piston, or electrical switch, etc., and in such case, the pawl elements and rack elements would be eliminated. For example, the switch could send an electric signal to the gear changing device mounted on or near the drive train of the bicycle. The pneumatic valve would apply air pressure through a line to the drive train. The hydraulic piston would apply pressure to a hydraulic line that would actuate the drive train.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A combination shift and brake lever arrangement for a bicycle, comprising:
   a single lever,
   a braking arrangement for mounting the single lever for movement in a first pivoting direction to perform a braking operation,
   a shifting arrangement for mounting the single lever for movement in a second pivoting direction different from the first pivoting direction,
   a shift control mechanism for controlling shifting of gears of the bicycle in a first shifting direction upon movement of the single lever in the second pivoting direction, a reverse control including an actuating element movable in said single lever for changing over the shift control mechanism to control shifting of the gears of the bicycle in a second opposite shifting direction upon movement of the single lever in the same second pivoting direction, and wherein a change in shifting of the gears of the bicycle between the first shifting direction and the second shifting direction is independent of distance moved by the single lever in the second pivoting direction.

2. A combination shift and brake lever arrangement according to claim 1, wherein said first pivoting direction is a front to back direction, and said second pivoting direction is a side to side direction.

3. A combination shift and brake lever arrangement according to claim 1, wherein said braking arrangement includes:
a first housing for mounting said combination shift and brake lever arrangement to a handlebar of a bicycle,
a second housing holding said single lever, and
a first pivot arrangement for pivotally mounting said second housing to said first housing for pivotal movement in said first pivoting direction.

4. A combination shift and brake lever arrangement according to claim 3, wherein said shifting arrangement includes a second pivot arrangement for pivotally mounting said single lever to said second housing for pivotal movement in said second pivoting direction.

5. A combination shift and brake lever arrangement according to claim 1, wherein said shifting arrangement includes a housing and a pivot arrangement for pivotally mounting said single lever to said housing for pivotal movement in said second pivoting direction.

6. A combination shift and brake lever arrangement according to claim 5, wherein said shift control mechanism is housed inside of said housing.

7. A combination shift and brake lever arrangement according to claim 6, wherein said shift control mechanism includes:
a first actuator coupled with said single lever for moving in response to pivotal movement of said single lever in said second pivoting direction,
a second actuator coupled with a shift cable of a bicycle for changing a gear of a derailleur of a bicycle, and
an engagement arrangement associated with said first and second actuators for shifting said second actuator in response to movement of said first actuator.

8. A combination shift and brake lever arrangement according to claim 7, wherein said single lever includes a first set of teeth, and said first actuator includes an actuator rack having a second set of teeth for meshing with said first set of teeth such that pivotal movement of said single lever results in translation movement of said actuator rack.

9. A combination shift and brake lever arrangement according to claim 8, wherein said second actuator includes a cable carrier rack having a third set of teeth, and said engagement arrangement includes a first pawl mounted to said actuator rack for engaging with said third set of teeth to move said cable carrier rack with said actuator rack upon pivotal movement of said single lever.

10. A combination shift and brake lever arrangement according to claim 9, wherein said third set of teeth are inclined in a first direction of movement of said cable carrier rack.

11. A combination shift and brake lever arrangement according to claim 9, wherein said cable carrier rack includes a fourth set of teeth, and said engagement arrangement includes a second pawl mounted to said housing for engaging with said fourth set of teeth to releasably lock said cable carrier rack in a desired position after said cable carrier rack has been moved with said actuator rack upon pivotal movement of said single lever.

12. A combination shift and brake lever arrangement according to claim 11, wherein said reverse control includes a device for disengaging said second pawl from said fourth set of teeth and for engaging said cable carrier rack after said cable carrier rack has been moved with said actuator rack upon pivotal movement of said single lever.

13. A combination shift and brake lever arrangement according to claim 12, wherein said device for disengaging includes:
a plunger movable in said single lever between a first position out of engagement with said second pawl and a second position into engagement with said second pawl to disengage said second pawl from said fourth set of teeth, and
an actuator for actuating said plunger to move between said first and second positions.

14. A combination shift and brake lever arrangement according to claim 13, wherein said cable carrier rack includes a fifth set of teeth, and said plunger also engages said fifth set of teeth of said cable carrier rack in said second position to releasably lock said cable carrier rack in a desired position after said cable carrier rack has been moved with said actuator rack upon pivotal movement of said single lever in the second pivoting direction.

15. A combination shift and brake lever arrangement according to claim 13, wherein said actuator includes a push button as said actuating element and which is slidable in said single lever, said push button having a cam surface for moving said plunger to said second position when said push button is depressed into said single lever.

16. A combination shift and brake lever arrangement according to claim 9, wherein said shift control mechanism includes a grate having a plurality of openings therein fixed to said housing, and said engagement arrangement includes a second pawl mounted to said cable carrier rack for engagement with said openings in said grate to releasably lock said cable carrier rack in a desired position after said cable carrier rack has been moved with said actuator rack upon pivotal movement of said single lever in the second pivoting direction.

17. A combination shift and brake lever arrangement according to claim 16, wherein said reverse control includes a device for disengaging said second pawl from said openings in said grate and for engaging said openings in said grate after said cable carrier rack has been moved with said actuator rack upon pivotal movement of said single lever in the second pivoting direction.

18. A combination shift and brake lever arrangement according to claim 17, wherein said device for disengaging includes:
a grate release movable between a first position out of engagement with said grate and a second position in engagement with said openings in said grate so as to move said second pawl from said openings in said grate after said cable carrier rack has been moved with said actuator rack upon pivotal movement of said single lever and for engaging said second pawl after said second pawl has been removed from said openings;
a plunger movable in said single lever between a first position out of operative engagement with said grate release and a second position into operative engagement with said grate release to move said grate release into engagement with said grate to disengage said second pawl from said grate, and an actuator for actuating said plunger to move between said first and second positions thereof.

19. A combination shift and brake lever arrangement according to claim 18, wherein said actuator includes a push button as said actuating element and which is slidable in said single lever, said push button having a cam surface for moving said plunger to said second position when said push button is depressed into said single lever.

\* \* \* \* \*